US008392198B1

(12) United States Patent
Berisha et al.

(10) Patent No.: US 8,392,198 B1
(45) Date of Patent: Mar. 5, 2013

(54) SPLIT-BAND SPEECH COMPRESSION BASED ON LOUDNESS ESTIMATION

(75) Inventors: Visar Berisha, Tempe, AZ (US); Andreas Spanias, Tempe, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 1371 days.

(21) Appl. No.: 12/062,251

(22) Filed: Apr. 3, 2008

Related U.S. Application Data

(60) Provisional application No. 60/909,916, filed on Apr. 3, 2007.

(51) Int. Cl.
*G01L 19/00* (2006.01)

(52) U.S. Cl. ........ 704/500; 704/501; 704/502; 704/503; 704/504

(58) Field of Classification Search ........................ None
See application file for complete search history.

(56) References Cited

U.S. PATENT DOCUMENTS

| | | | | |
|---|---|---|---|---|
| 6,014,621 | A * | 1/2000 | Chen | 704/220 |
| 6,097,824 | A * | 8/2000 | Lindemann et al. | 381/315 |
| 2002/0038216 | A1* | 3/2002 | Suzuki | 704/500 |
| 2005/0004793 | A1* | 1/2005 | Ojala et al. | 704/219 |
| 2007/0208565 | A1* | 9/2007 | Lakaniemi et al. | 704/268 |
| 2008/0027717 | A1* | 1/2008 | Rajendran et al. | 704/210 |
| 2008/0177532 | A1* | 7/2008 | Greiss et al. | 704/200.1 |

OTHER PUBLICATIONS

Berisha, Visar et al., "A Scalable Bandwidth Extension Algorithm," Proceedings of the IEEE International Conference on Acoustics, Speech, and Signal Processing, Apr. 2007, pp. 601-604, vol. 4, IEEE.

Berisha, Visar et al., "Wideband Speech Recovery Using Psychoacoustic Criteria," EURASIP Journal on Audio, Speech, and Music Processing, 2007, vol. 2007, aricle ID 16816, Hindawi Publishing Corporation.

Chen, Guo et al., "HMM-Based Frequency Bandwidth Extension for Speech Enhancement Using Line Spectral Frequencies," Proceedings of the IEEE International Conference on Acoustics, Speech, and Signal Processing, May 2004, pp. 709-712, vol. 1, IEEE.

Chen, Siyue et al., "Artificial Bandwidth Extension of Telephony Speech by Data Hiding," Proceedings of the IEEE International Symposium on Circuits and Systems, May 2005, pp. 3151-3154, IEEE.

Chen, Siyue et al., "Speech Bandwidth Extension by Data Hiding and Phonetic Classification," Proceedings of the IEEE International Conference on Acoustics, Speech, and Signal Processing, Apr. 2007, pp. 593-596, vol. 4, IEEE.

Cheng, Yan Ming et al., "Statistical Recovery of Wideband Speech from Narrowband Speech," IEEE Transactions on Speech and Audio Processing, Oct. 1994, pp. 544-548, vol. 2, No. 4, IEEE.

Dietz, Martin et al, "Spectral Band Replication, a Novel Approach in Audio Coding," Proceedings of the 112th Convention of the Audio Engineering Society, May 2002, convention paper 5553, AES.

(Continued)

*Primary Examiner* — Leonard Saint Cyr
(74) *Attorney, Agent, or Firm* — Withrow & Terranova, P.L.L.C.

(57) ABSTRACT

A frame is received that has the wideband audio signal. The low band audio signal is encoded to generate an encoded low band signal. The high band signal is analyzed to determine whether the high band signal is perceptually relevant to the low band signal. If the high band signal is not perceptually relevant to the low band signal, the low band signal is encoded and provided in a frame to the decoder without including parameters corresponding to characteristics of the high band signal. If the high band signal is perceptually relevant, the high band signal is encoded to generate an encoded high band signal. The resultant frame that is sent to the decoder will include a combination of the encoded low band signal and the encoded high band signal.

15 Claims, 16 Drawing Sheets

OTHER PUBLICATIONS

Geiser, Bernd et al., "Backwards Compatible Wideband Telephony in Mobile Networks: CELP Watermarking and Bandwidth Extension," Proceedings of the IEEE International Conference on Acoustics, Speech, and Signal Processing, Apr. 2007, pp. 533-536, vol. 4, IEEE.
Glasberg, Brian R. et al., "Derivation of Auditory Filter Shapes from Notched-Noise Data," Hearing Research, 1990, pp. 103-138, vol. 47, Elsevier Science Publishers B.V.
Glasberg, Brian R. et al., "Prediction of Absolute Thresholds and Equal-Loudness Contours Using a Modified Loudness Model (L)," Journal of the Acoustical Society of America, Aug. 2006, pp. 585-588, vol. 120, No. 2, Acoustical Society of America.
Hair, G. D. et al., "Automatic Speaker Verification Using Phoneme Spectra," Journal of the Acoustical Society of America, 1972, pp. 131-131, vol. 51, No. 1A, Acoustical Society of America.
Jax, Peter et al., "Artificial Bandwidth Extension of Speech Signals Using MMSE Estimation Based on a Hidden Markov Model," Proceedings of the IEEE International Conference on Acoustics, Speech, and Signal Processing, Apr. 2003, pp. 680-683, vol. 1, IEEE.
Jax, Peter et al., "An Upper Bound on the Quality of Artificial Bandwidth Extension of Narrowband Speech Signals," Proceedings of the IEEE International Conference on Acoustics, Speech, and Signal Processing, May 2002, pp. 237-240, vol. 1, IEEE.
McCree, Alan, "A 14 kB/s Wideband Speech Coder with a Parametric Highband Model," Proceedings of the IEEE International Conference on Acoustics, Speech, and Signal Processing, 2000, pp. 1153-1156, vol. 2, IEEE.
McCree, Alan et al., "An Embedded Adaptive Multi-Rate Wideband Speech Coder," Proceedings of the IEEE International Conference on Acoustics, Speech, and Signal Processing, May 2001, pp. 761-764, vol. 2, IEEE.
Nilsson, Mattias et al., "Avoiding Over-Estimation in Bandwidth Extension of Telephony Speech," Proceedings of the IEEE International Conference on Acoustics, Speech, and Signal Processing, May 2001, pp. 869-872, vol. 2, IEEE.
Nilsson, Mattias et al., "Gaussian Mixture Model Based Mutual Information Estimation Between Frequency Bands in Speech," Proceedings of the IEEE International Conference on Acoustics, Speech, and Signal Processing, May 2002, pp. 525-528, vol. 1, IEEE.
Nilsson, Mattias et al., "On the Mutual Information Between Frequency Bands in Speech," Proceedings of the IEEE International Conference on Acoustics, Speech, and Signal Processing, May 2000, pp. 1327-1330, vol. 3, IEEE.
Spanias, Andreas S., "Speech Coding: A Tutorial Review," Proceedings of the IEEE, Oct. 1994, vol. 82, No. 10, IEEE.
Spanias, Andreas S. et al, "Audio Signal Processing and Coding," 2007, pp. 91-95, John Wiley & Sons, Inc.
Unno, Takahiro et al., "A Robust Narrowband to Wideband Extension System Featuring Enhanced Codebook Mapping," Proceedings of the IEEE International Conference on Acoustics, Speech, and Signal Processing, Mar. 2005, IEEE.

* cited by examiner

| SOUND | I (f ; y) | H (y) | $\frac{I(f;y)}{H(y)}$ |
|---|---|---|---|
| V | 0.57 | 4.56 | 12.5% |
| G | 0.59 | 4.78 | 12.34% |
| C | 0.87 | 5.29 | 16.45% |
| S | 0.56 | 4.97 | 11.27% |
| F | 0.45 | 4.60 | 9.78% |
| N | 0.55 | 4.63 | 11.88% |

FIG. 2A

| SOUND | I (f ; y) | H (y) | $\frac{I(f;y)}{H(y)}$ |
|---|---|---|---|
| V | 1.45 | 14.77 | 9.82% |
| G | 1.53 | 13.80 | 11.09% |
| C | 1.60 | 14.83 | 10.79% |
| S | 1.23 | 15.55 | 7.91% |
| F | 1.09 | 15.02 | 7.26% |
| N | 1.20 | 15.82 | 7.59% |

FIG. 2B

| FEATURE VECTOR ( f ) | VARIABLE NAME | DIMENSION | I (f ; y) |
|---|---|---|---|
| LOW-BAND 10TH ORDER LPC-CEPSTRUM | $C_{lb}$ | 10 | 2.2401 |
| FRAME ENERGY | $E_n$ | 1 | 0.9285 |
| SPECTRAL CENTROID | SC | 1 | 0.7913 |
| ZERO CROSSING RATE | Z | 1 | 0.7453 |
| PITCH PERIOD | P | 1 | 0.4450 |
| SPECTRAL FLATNESS | SF | 1 | 0.4387 |
| LOCAL KURTOSIS | K | 1 | 0.2037 |

FIG. 12

SPLIT-BAND SPEECH COMPRESSION BASED ON LOUDNESS ESTIMATION

This application claims the benefit of U.S. provisional application Ser. No. 60/909,916 filed Apr. 3, 2007, the disclosure of which is incorporated herein by reference in its entirety.

FIELD OF THE INVENTION

The present invention relates to encoding, and in particular to encoding speech using a split-band approach based on loudness estimation.

BACKGROUND OF THE INVENTION

The public switched telephony network (PSTN) and most of today's cellular networks use narrowband (0.3-3.4 kHz) speech coders. This in turn places limits on the naturalness and intelligibility of speech[1] and is most problematic for sounds whose energy is spread over the entire audible spectrum. For example, unvoiced sounds such as ‘s’ and ‘f’ are often difficult to distinguish with a narrowband representation. In FIGS. 1A-1F, spectral plots for different phonemes are provided. For the fricatives (‘s’, ‘sh’, ‘z’) of FIGS. 1A-1C, respectively, the energy is spread throughout the spectrum; however most of the energy of the vowels (‘ae’, ‘aa’, ‘ay’) of FIGS. 1D-1F, respectively, lies within the low frequency range[2]. Split-band compression algorithms recover the narrowband spectrum (0.3-3.4 kHz) and the high band spectrum (3.4-7 kHz) separately. The main goal of these algorithms is to encode wideband (0.3-7 kHz) speech at the minimum possible bit rate. A number of these techniques make use of the correlation between the low band and the high band to predict the wideband speech from extracted narrowband features[3,4,5,6,7]. Some of these algorithms attempt to cleverly embed the high band parameters in the low frequency band[8,9]. Others generate coarse representations of the high band at the encoder and transmit them as side information to the decoder[10,11,12,13,3,14,15].

A set of popular bandwidth extension algorithms attempt to recover wideband speech from narrowband content using predictive models. However, recent studies show that the mutual information between the narrowband and the high frequency bands is often insufficient for prediction-based wideband synthesis[16,17,18]. In the tables of FIGS. 2A and 2B, a predictability metric developed by Nilsson et al.[16] is shown for the high band for two different scenarios. This predictability metric is a ratio of the mutual information between a set of low-band and high band features and the uncertainty (entropy) of the high band features. FIG. 2A provides a ratio between the mutual information of the narrowband cepstral coefficients (f) and the high band energy ratio (y), I (f), and the entropy of the high band energy ratio H (y), for different sounds. FIG. 2B provides a ratio between the mutual information of the narrowband cepstral coefficients (t) and the high band cepstral coefficients (y), I (f, y), and the entropy of the highband cepstral coefficients H (y), for different sounds. FIG. 2A shows the normalized mutual information between the narrowband cepstrum and the high band to low-band energy ratio, and FIG. 2B shows the same metric between the narrowband cepstrum and the high band cepstrum. As the tables show, the available narrowband information reduces uncertainty in the high band energy only by about 13% and in the high band cepstrum only by about 9%. These results imply that algorithms based on predicting the high band often generate erroneous estimates[10]. It is therefore evident that for improved robustness, the high band spectrum should be quantized and transmitted as side information.

A few split-band coders based on coarse high band representations have been recently proposed[3,12,13,19]. Although these techniques provide improved speech quality relative to prediction-based algorithms, most do not exploit opportunities to further reduce bit rates through perceptual modeling. In fact, the bit rates associated with the high band representation are often unnecessarily high because they allocate the same number of bits for high band generation to each frame[3,13]. It is apparent from FIG. 1 that a wideband representation is more beneficial for certain frame types (e.g. unvoiced fricatives). In an effort to further study which frames benefit from full-bandwidth representations, the partial loudness (PL) of the high band in the presence of the low band is analyzed[20,21,22]. The PL is a metric for estimating the contribution of the high band to the overall loudness of a speech segment. In FIG. 3, the PL for different phonemes is plotted. As shown in FIG. 3, for most phonemes the partial loudness of the high band is under 0.25 sones. Notably, the sone is a measure of loudness. One sone is defined as the loudness of a 1000 Hz tone at 40 dBSPL, presented binaurally from a frontal direction in free field. In fact, with the exception of a few fricatives, the high band contribution to the overall loudness of the frame is relatively small. As such, algorithms that perform bandwidth extension by encoding the high band of every frame often operate at unnecessarily high bit rates.

FIGS. 2A and 2B show that some side information should be transmitted to the decoder in order to accurately characterize certain wideband speech; the plot of FIG. 3, however, indicates that side information is not necessary for every frame. Accordingly, there is a need for an encoding technique that reduces the amount of side information use for the high band without affecting speech quality.

SUMMARY OF THE INVENTION

The present invention relates to encoding and decoding a wideband speech signal. Although the coding techniques have broad applicability, they are particularly beneficial in telephony applications, such as landline and cellular-based telephony communications. In general, the wideband audio signal is divided into a low band signal residing in a lower bandwidth portion and a high band signal residing in a higher bandwidth portion of the wideband audio signal. Further, the wideband audio signal is generally framed and processed prior to encoding at an encoder. The encoding technique effectively analyzes the high band signal and determines whether or not parameters of the high band signal should be encoded along with the low band signal for each successive frame. As such, a variable rate encoding technique is provided that dynamically determines whether to encode the high band signal based on the high band signal itself.

In particular, a frame is received that has the wideband audio signal. The low band audio signal is encoded to generate an encoded low band signal. The high band signal is analyzed to determine whether it is perceptually relevant. Perceptual relevance bears on an ability of the ultimate decoder to decode an encoded version of the low band signal and recover the wideband audio signal to a desired degree. If the high band signal is not perceptually relevant, the low band signal is encoded and provided in a frame to the decoder without including parameters corresponding to characteristics of the high band signal. If the high band signal is perceptually relevant, the high band signal is encoded to generate an encoded high band signal. The resultant frame that is sent to the decoder will include a combination of the encoded low band signal and the encoded high band signal. Accordingly, overall encoding will vary based on the perceptual relevance of the high band signal on a frame-by-frame basis.

As noted, the determination to encode the high band signal for a given frame depends on the perceptual relevance of the high band signal. Determining the perceptual relevance of the high band signal may be based on the perceived loudness of the high band signal, along with or in relation to the low band signal. In one embodiment, the perceived loudness of the high band signal is based on an analysis of the instantaneous loudness of the high band signal as well as the long-term loudness of the high band signal. If the instantaneous loudness and the long-term loudness are sufficient, the high band signal is encoded and provided along with the encoded low band signal to the decoder. Preferably, an encoding indicator is provided in the frame carrying encoded signals to the decoder to indicate whether the frame includes the encoded high band signal.

When the high band signal is encoded, the rate of encoding may vary from frame to frame. In one embodiment, features are extracted from the low band signal and used to predict a high band envelope for the high band signal at the encoder. The high band envelope is predicted based on the features extracted from the low band signal. The actual high band envelope of the wideband audio signal is also determined. The extent of encoding of the high band audio signal is based on differences between the predicted high band envelope and the actual high band envelope. Notably, the encoded high band signal may correspond to high band parameters that were selected as being relevant for decoding based on the differences found above.

In another embodiment, encoding of the high band signal is based on excitation patterns. In particular, a predicted speech signal is determined based on the low band audio signal, in much the same way as the decoder will ultimately try to recreate the wideband audio signal based on an encoded version of the low band signal. From the predicted speech signal, a predicted high band excitation pattern is determined. An original high band excitation pattern is also determined from the wideband audio signal itself. The differences between the predicted high band excitation pattern and the original high band excitation pattern are analyzed to determine how to encode the high band signal.

In either of these embodiments, the differences between the predicted high band envelope or excitation pattern and the original high band envelope or excitation pattern may be analyzed on a sub-band-by-sub-band basis. In essence, the high band may be divided into sub-bands and the relative differences between the desired metrics may be analyzed to identify sub-bands that are prone to errors in decoding. For each frame, the sub-band or sub-bands of the high band envelope or excitation pattern that are prone to error during decoding are selected. The high band audio signal is encoded based on these differences. In one embodiment, high band parameters of the original high band signal are encoded as the high band signal only for the selected sub-bands.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A and 2B are tables providing the ratio between the mutual information of the narrowband cepstral coefficients and the high band cepstral coefficients, and the mutual information between the narrowband and high band energy ratio.

Figure 10:
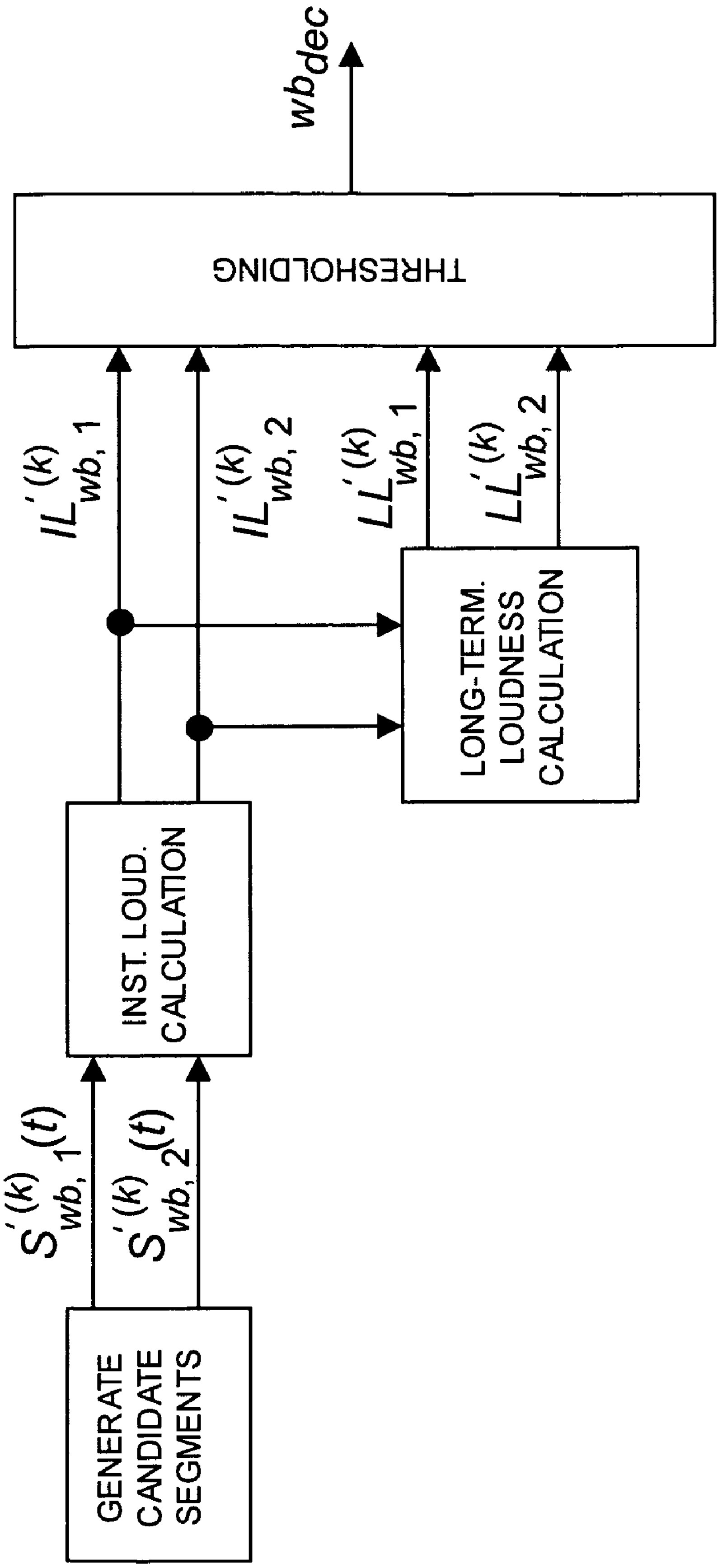

FIG. 10 provides a high-level overview of a rate determination algorithm according to one embodiment of the present invention.

Figure 11:
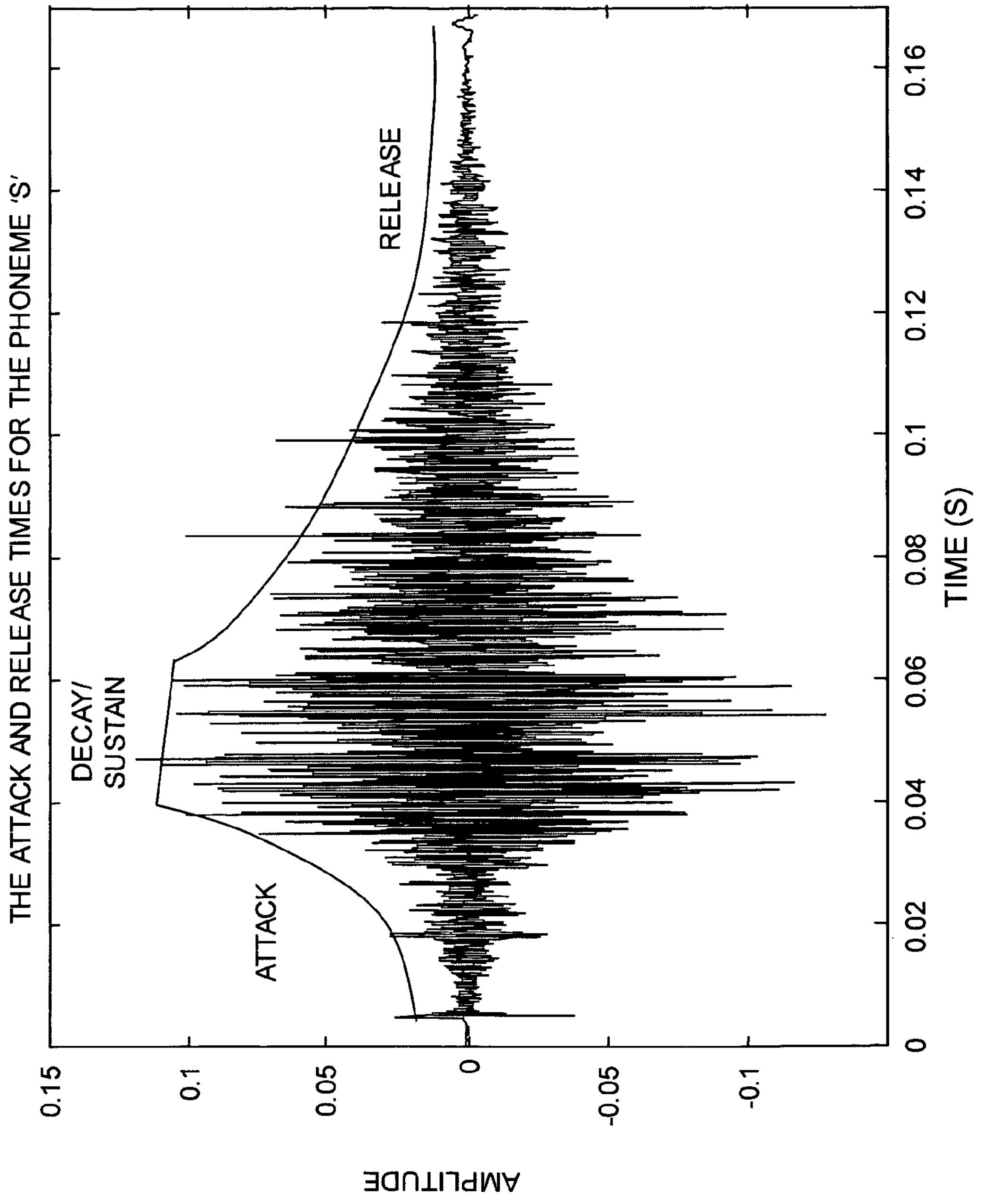

FIG. 11 illustrates the attack and release times for the phoneme 's'.

FIG. 12 is a table illustrating exemplary features that may be extracted from the low band signal according to one embodiment of the present invention.

Figure 13A:
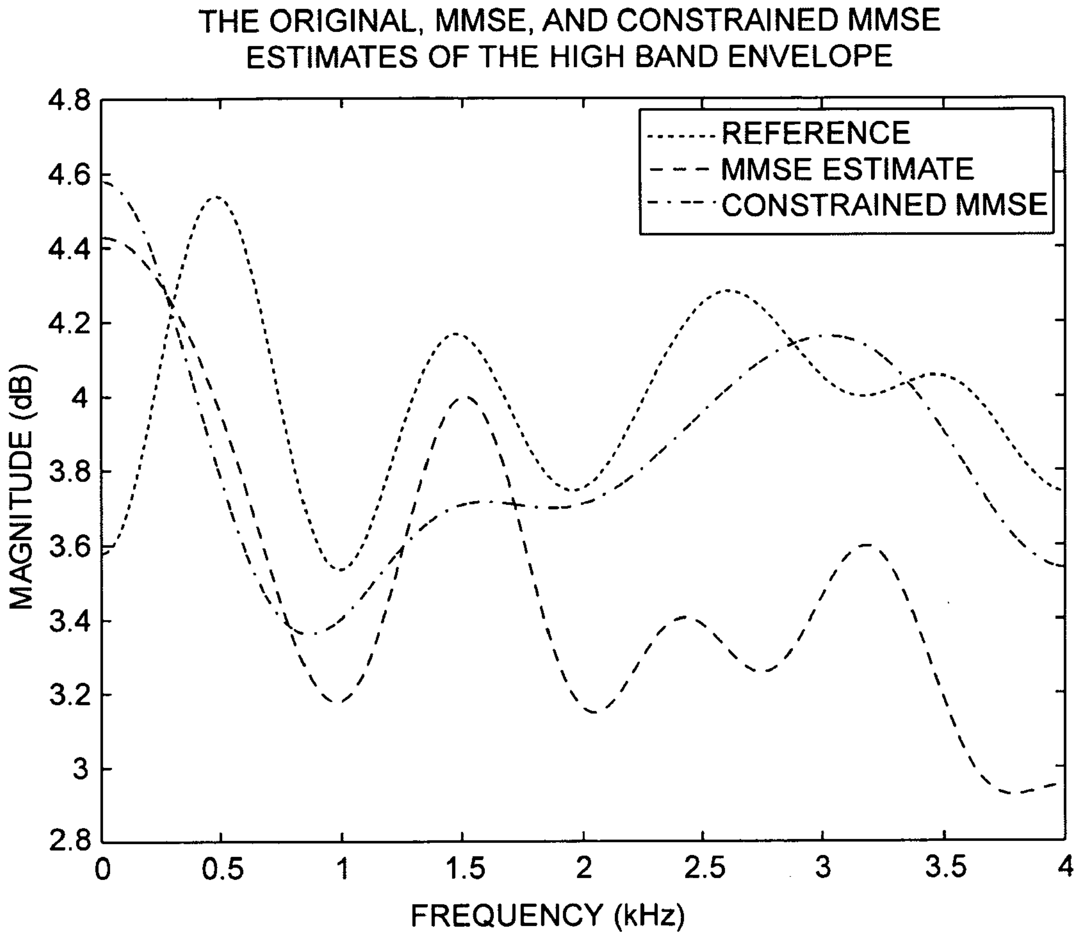
Figure 13B:
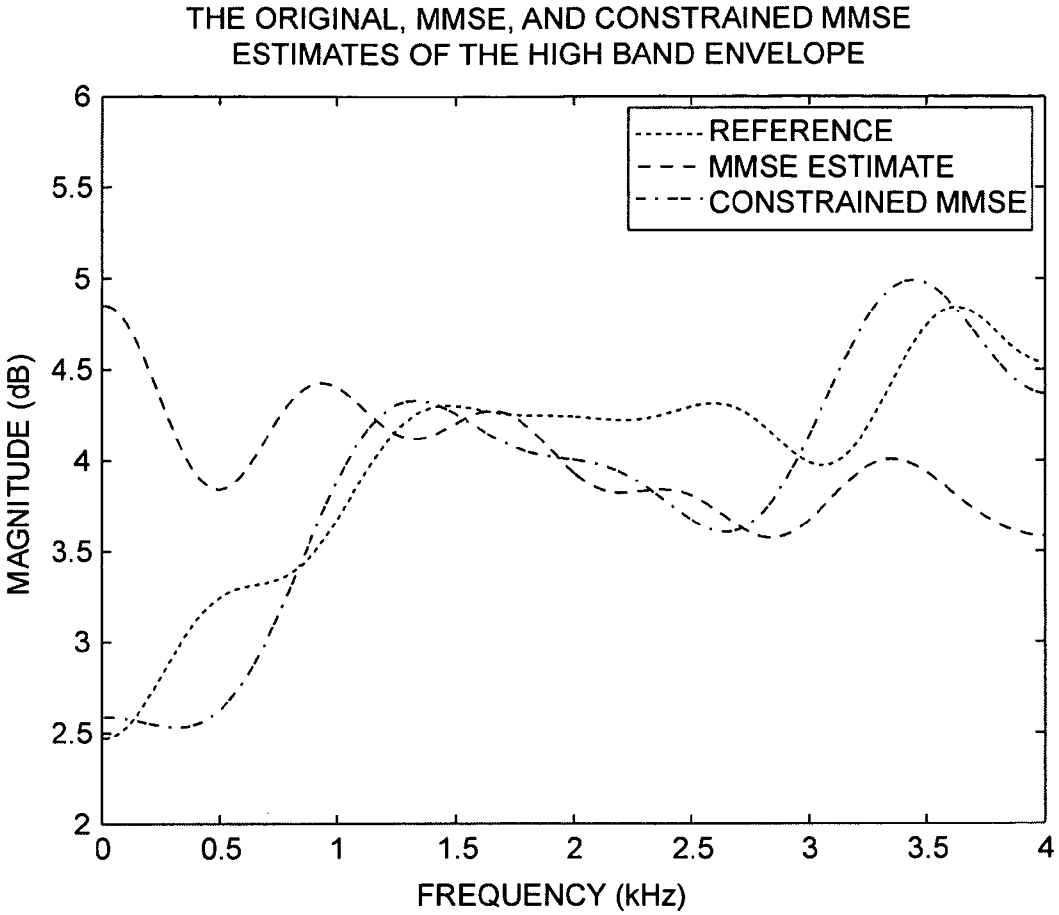

FIGS. 13A and 13B illustrate the original, MMSE, and constrained MMSE estimates of a high band envelope for different signals.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1A:
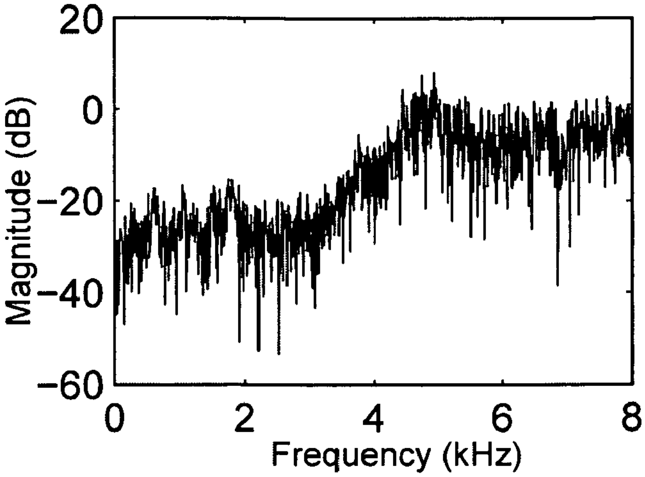
FIGS. 1A-1F illustrate the short-term power spectrum for different phonemes.
Figure 1B:
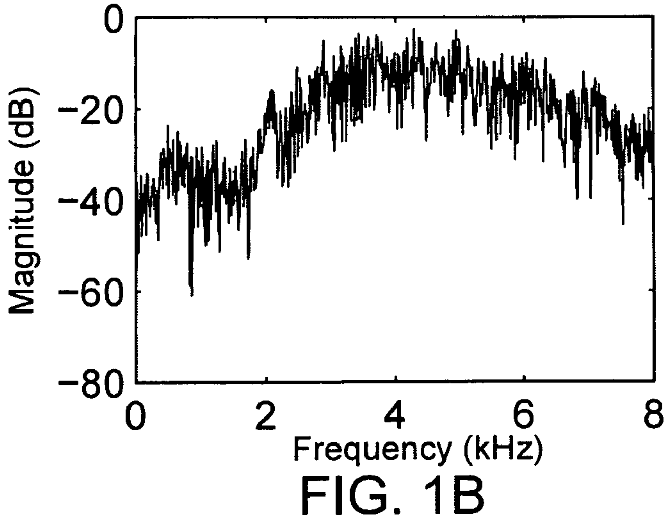
Figure 1C:
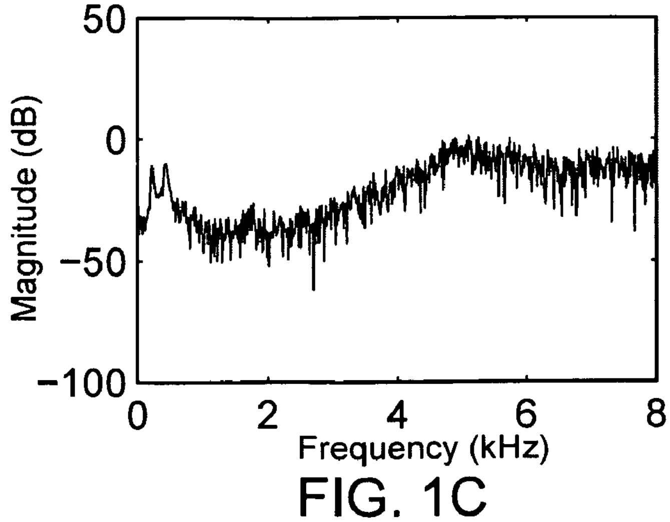
Figure 1D:
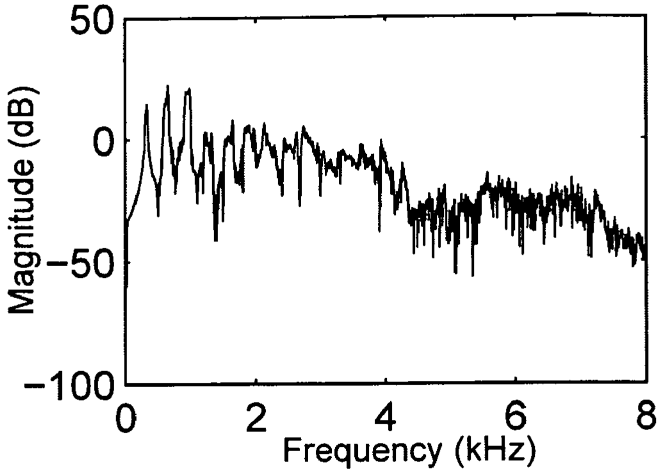
Figure 1E:
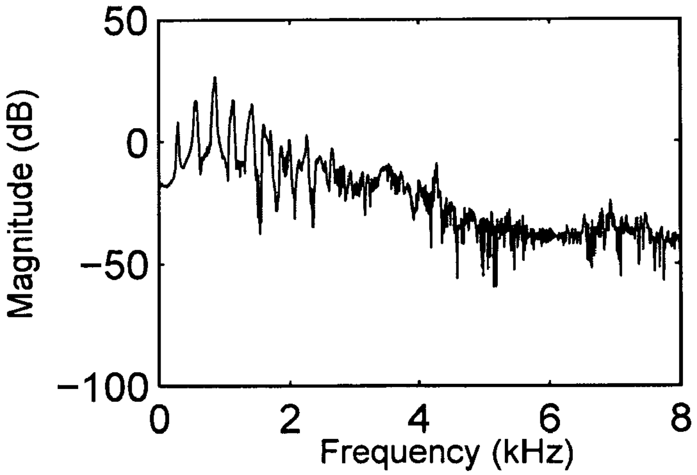
Figure 1F:
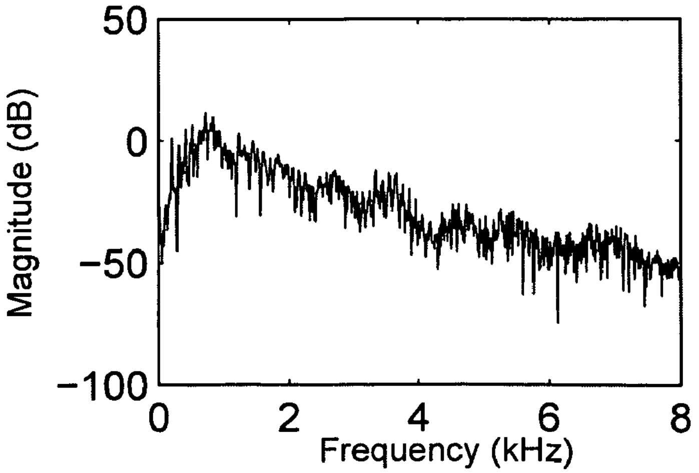
Figure 3:
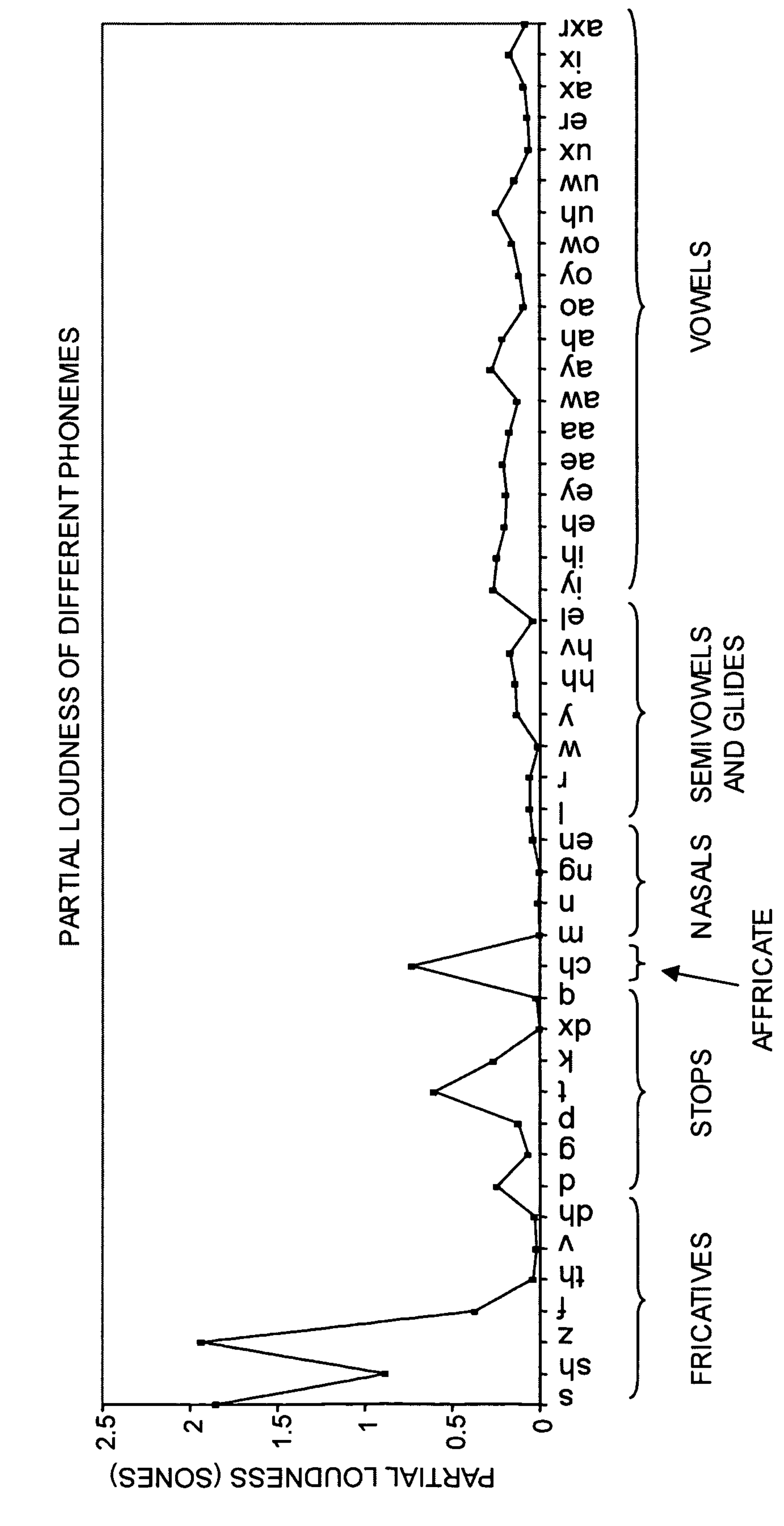
FIG. 3 illustrates the partial loudness of different phonemes.
Figure 4:
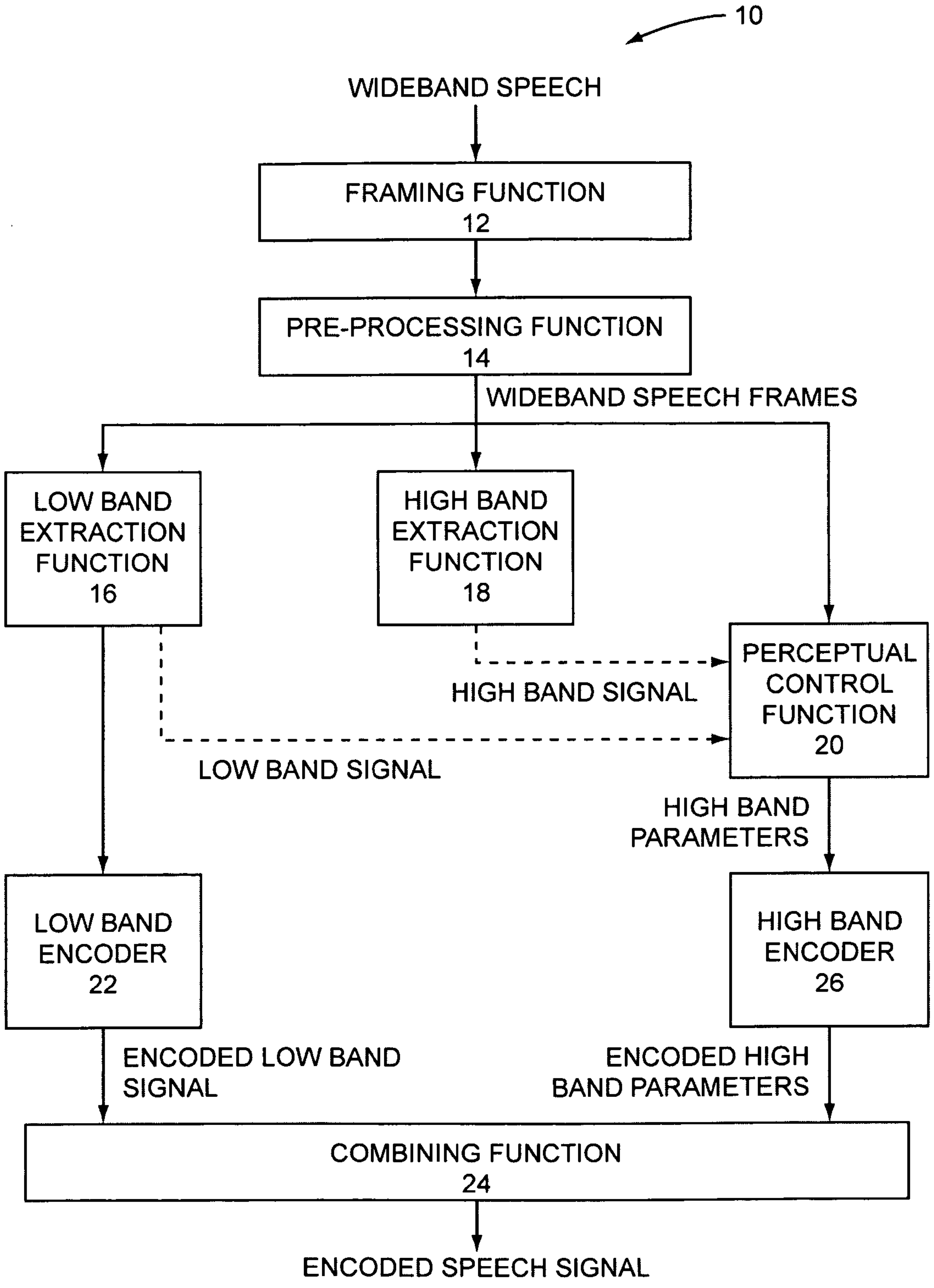
FIG. 4 is a block representation of an encoder according to one embodiment of the present invention.

With reference to FIG. 4, a functional block diagram of an encoder 10 configured according to one embodiment of the present the invention is provided. Initially, assume digitized wideband speech that was sampled at 16 kHz is streamed to a framing function 12, which breaks the wideband speech stream into frames. In the illustrated embodiment, the frames are defined to correspond to twenty (20) milliseconds of speech as is common to many telephony applications; however, the frames may be defined to have any desired length. The wideband speech frames are presented to a pre-processing function 14 that uses a windowing or like filtering techniques to remove unwanted sidebands and the effects thereof.

The wideband speech frames may then be provided to a low band extraction function 16, a high band extraction function 18, and a perceptual control function 20. As noted above, the digitized speech was sampled at 16 kHz, and therefore is sufficient to represent a speech signal having bandwidth of 8 kHz, according to Nyquist theory. With the present invention, the overall speech signal is separated into a low band signal and a high band signal by the low and high band extraction functions 16, 18, respectively, where the low band signal contains speech information between zero and 4 kHz and the high band signal contains speech information between 4 kHz and 8 kHz. As such, each frame is associated with a low band signal and a high band signal. The low band signal corresponds to the narrowband signal of a traditional encoder, as described above. Those skilled in the art will recognize that any number of bands may be used and actual bands may be selected as desired.

The low band signal for each frame is sent to a low band (or narrow band) encoder 22, which will encode the low band signal by compressing it into a few low band parameters that are sufficient to allow a decoder to recover the low band signal in traditional fashion. The output of the low band encoder 22 provides an encoded low band signal for each frame to a combining function 24, which is described further below. In one embodiment, the low band encoder 22 provides linear prediction encoding; however, various types of encoding may be used.

The high band signal provided by the high band extraction function 18 for each frame is sent to a perceptual control function 20. Notably, the high band extraction function 18 may be provided by the perceptual control function and is shown separately for illustrative purposes. The perceptual control function 20 initially analyzes the high band signal to determine whether the high band signal is perceptually relevant to the low band signal. The perceptual relevance of the high band signal corresponds to the influence the high band signal has on the decoder being able to decode the encoded low band signal and sufficiently recover the wideband speech signal with a desired quality. Perceptual relevance may be determined based on the low band signal, the high band signal, the wideband speech signal, or any combination thereof. Examples of how perceptual relevance is determined according to preferred embodiments of the invention are provided further below.

When the high band signal for a frame is perceptually relevant, the perceptual control function 20 will determine what parameters for the high band signal should be encoded and provide those high band parameters to a high band encoder 26. The high band encoder 26 will encode the high band parameters and provide the encoded high band parameters to the combining function 24. The combining function 24 will effectively multiplex or otherwise combine the encoded low band signal with the corresponding high band parameters for a given frame to provide an encoded speech signal. If the high band signal is not perceptually relevant to the low band signal for a given frame, high band parameters are not encoded and only the encoded low band signal is provided in the encoded speech signal for a given frame in traditional fashion. As such, the encoded speech frame will include high band parameters only when the high band signal is deemed perceptually relevant by the perceptual control function 20.

Preferably, the perceptual control function 20 will provide a high band encoding indicator that indicates whether or not the high band signal is perceptually relevant, and thus, whether high band parameters are encoded for the given frame. The high band encoder 26 will cooperate with the combining function 24 to make sure the high band encoding indicator is provided in the frame for the corresponding encoded speech signal. The high band encoding indicator may be encoded as a dedicated bit that is active when high band parameters are available and inactive when high band parameters are not available.

As stated above, the perceptual control function 20 initially decides whether the high band signal is perceptually relevant, and only generates high band parameters for the high band signal when the high band signal is perceptually relevant. In one embodiment, the perceived loudness of the high band signal is analyzed by the perceptual control function 20 to make a threshold determination as to whether the high band signal is perceptually relevant. If the high band signal is not associated with a certain perceived loudness, high band signal information will not be provided or encoded for a given frame. If the high band signal is associated with a certain perceived loudness, high band parameters of the high band signal are identified for the given frame and sent to the high band encoder 26 for encoding. The high band encoder 26 will encode the identified high band parameters, which may represent all, a portion, or multiple portions of the high band signal, to provide the encoded high band parameters. Notably, criteria other than perceived loudness may be used to determine whether the high band signal is perceptually relevant to the speech signal.

Most speech compression algorithms focus on energy-based metrics for improving speech quality. These methods are not perceptually optimal, however, since energy alone is not a sufficient predictor of perceptual importance. The motivation for proposing a loudness-based metric rather than one based on energy lies in the fact that loudness is a direct measure of neural stimulation, whereas traditional energy is only correlated to neural stimulation. In fact, two signals of identical energy can have loudness values that differ by more than a factor of two.

In one embodiment, the perceived loudness for a frame is based on both the instantaneous loudness (IL) and long term loudness (LTL) associated with the frame. As the name indicates, IL refers to the relative loudness of the speech represented by a frame at a given moment and without regard to other surrounding frames. LTL is a measure of average loudness over a period of time, and thus over a number of consecutive frames. Depending on the speech, both IL and LTL may have an impact on perceived loudness for a given frame.

In one embodiment, a wideband speech segment and a narrowband speech segment, which may correspond to speech over several frames, are generated for each frame. The wideband speech segment includes previously encoded speech information from prior frames and a wideband version of the speech for a given frame that includes both low band information and high band information. The narrowband speech segment includes previously encoded speech information from the same prior frames and a narrowband version of the speech for a given frame that includes the low band information, but does not include any high band information. From the wideband speech segment, a wideband LTL metric is generated, and from the narrowband speech segment, a narrowband LTL metric is generated. The difference between the narrowband LTL metric and the wideband LTL metric is calculated to provide an LTL error.

From the wideband speech in the frame, a wideband IL metric is generated, and from the narrowband speech in the frame, a narrowband IL metric is generated. The difference between the narrowband IL metric and the wideband IL metric is also calculated to provide an IL error. The IL error and the LTL error are compared to corresponding thresholds, which are defined based on desired performance criteria, to determine whether the high band signal is perceptually relevant for the given frame. If both error thresholds are met by the IL and LTL errors, the high band information is deemed perceptually relevant and the perceptual control function 20 will take the necessary steps to ascertain pertinent high band parameters to provide in association with the encoded low band signal for the given frame.

When the perceptual control function 20 determines that the high band signal is perceptually relevant, only the perceptually relevant portions of the high band signal need be identified for encoding to reduce the gain in bandwidth required for transmitting the encoded speech. In one embodiment, the high band signal is divided into a number of sub-bands, and each sub-band is analyzed to determine its perceptual relevance. In an effort to maintain efficiency, only parameters for those sub-bands that are deemed perceptually relevant are selected for encoding and delivery to a decoder along with the encoded low band signal.

In general, a decoder may decode the encoded low band signal to retrieve the decoded low band signal. From the decoded low band signal, the high band signal is estimated. The decoded low band signal and the estimated high band signal together form the decoded wideband speech, which corresponds to an estimate of the original wideband speech signal. As noted, the quality of the decoded wideband speech may be a function of how well the high band signal is estimated. Accordingly, the high band signal may be analyzed at the perceptual control function 20 of the encoder 10 to predict how well the decoder will decode the encoded low band signal and predict the high band signal based on the decoded low band signal. Since the decoding techniques of the decoder are known, the encoder 10 may employ the same decoding techniques to determine whether the high band signal, and thus the wideband speech signal, can be properly estimated based on the encoded low band signal without the aid of any or certain high band parameters.

Figure 5:
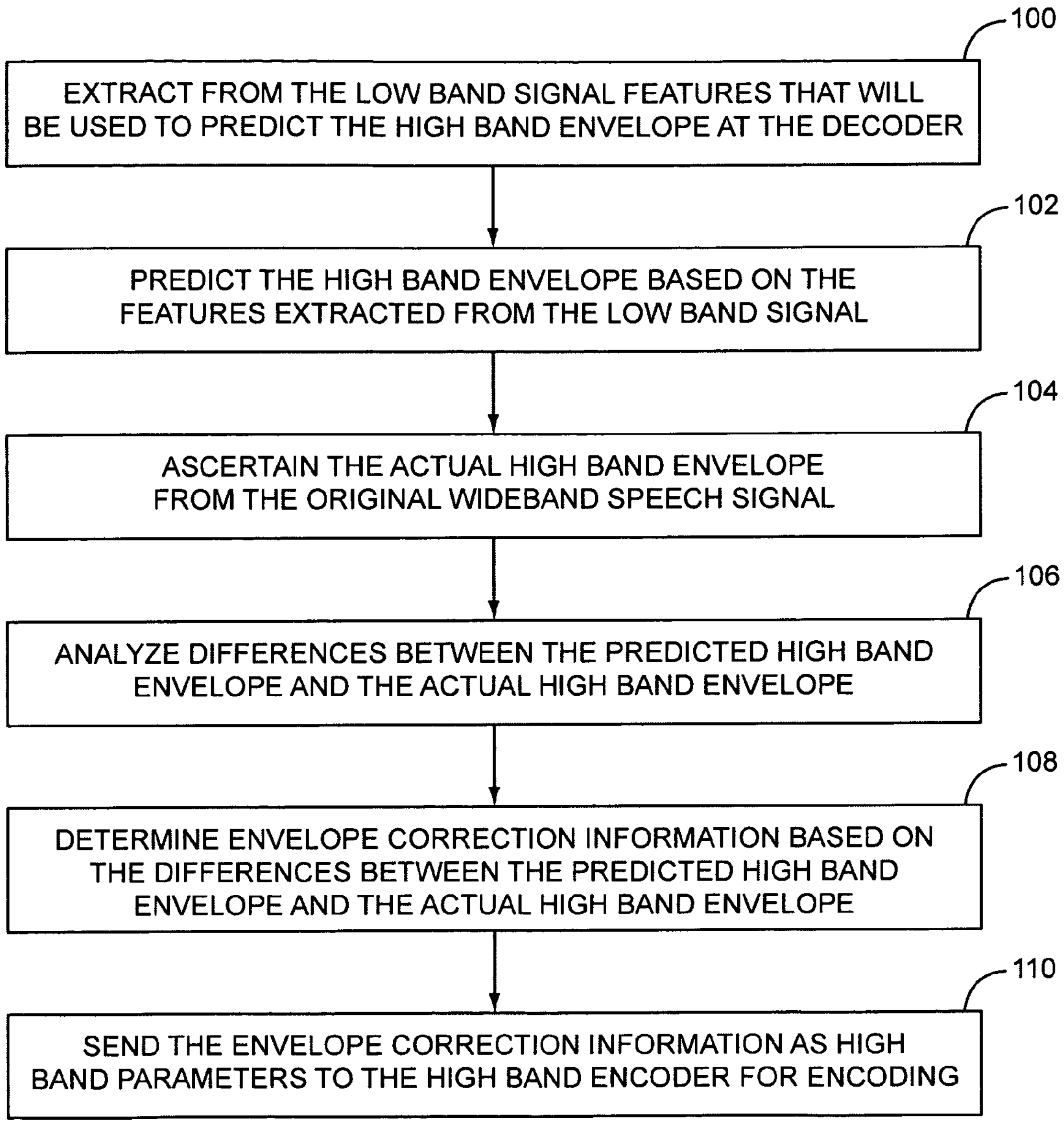
FIG. 5 is a flow diagram illustrating the comparison of envelope information according to one embodiment of the present invention.

With reference to FIG. 5, a flow diagram is provided to illustrate a technique for generating high band parameters for a given frame when the corresponding high band signal is deemed perceptually relevant. Initially, the perceptual control function 20 will extract from the low band signal features that will be used to predict the high band envelope at the encoder (step 100). The features that are extracted from the low band signal are used to assist in encoding the low band signal according to the encoding techniques employed by the low band encoder 22. Further detail on exemplary features is provided further below. Next, the perceptual control function 20 will predict the high band envelope based on features extracted from the low band signal (step 102). Notably, depending on the configuration of the encoder 10, the low band signal may be derived by the perceptual control function 20 directly from the wideband speech frames provided by the preprocessing function 14 or from the low band extraction function 16.

Next, the actual high band envelope is ascertained from the original, or actual, wideband speech signal (step 104). The differences between the predicted high band envelope and the actual high band envelope are then analyzed (step 106). Based on the differences between the predicted high band envelope and the actual high band envelope, envelope correction information is determined (step 108). The envelope correction information is configured to allow the decoder 28 to modify how it would normally estimate the actual high band envelope based only on the decoded low band signal to provide a more accurate estimate of the high band envelope. The envelope correction information is sent to the high band encoder 26 as high band parameters for encoding (step 110). Thus, for frames where the high band signal is perceptually relevant, encoded high band parameters corresponding to envelope correction information are sent along with the encoded low band signal to the decoder 28. Since the differences between the predicted high band envelope and the original high band envelope may vary from frame to frame, the type and extent of the envelope correction information determined for different frames may vary. Preferably, only the envelope correction information that is necessary to assist in maintaining a desired speech quality is provided. Accordingly, the encoded high band parameters corresponding to the envelope correction information are combined with the encoded low band signal for a given frame by the combining function 24. The resulting encoded speech signal is then delivered toward the decoder 28. Again, for those frames where the high band signal is deemed not to be perceptually relevant, no envelope correction information is provided.

One exemplary way of analyzing the differences between a predicted high band envelope and the original high band envelope is to employ an excitation pattern matching technique according to one embodiment of the present invention. As those skilled in the art will appreciate, one common encoding technique employs a source-filter model. In the source-filter model, speech is modeled as a combination of a sound source, such as the vocal cords, and a filter, such as the vocal tract. For encoding, an excitation corresponds to a sound source, and a transfer function, or envelope, corresponds to a filter. When an encoded speech signal includes an excitation and an envelope, a speech signal may be decoded. From the speech signal, an excitation pattern may be obtained. The excitation pattern is effectively a measure of the neural excitation along the bandwidth of the speech signal.

Figure 6A:
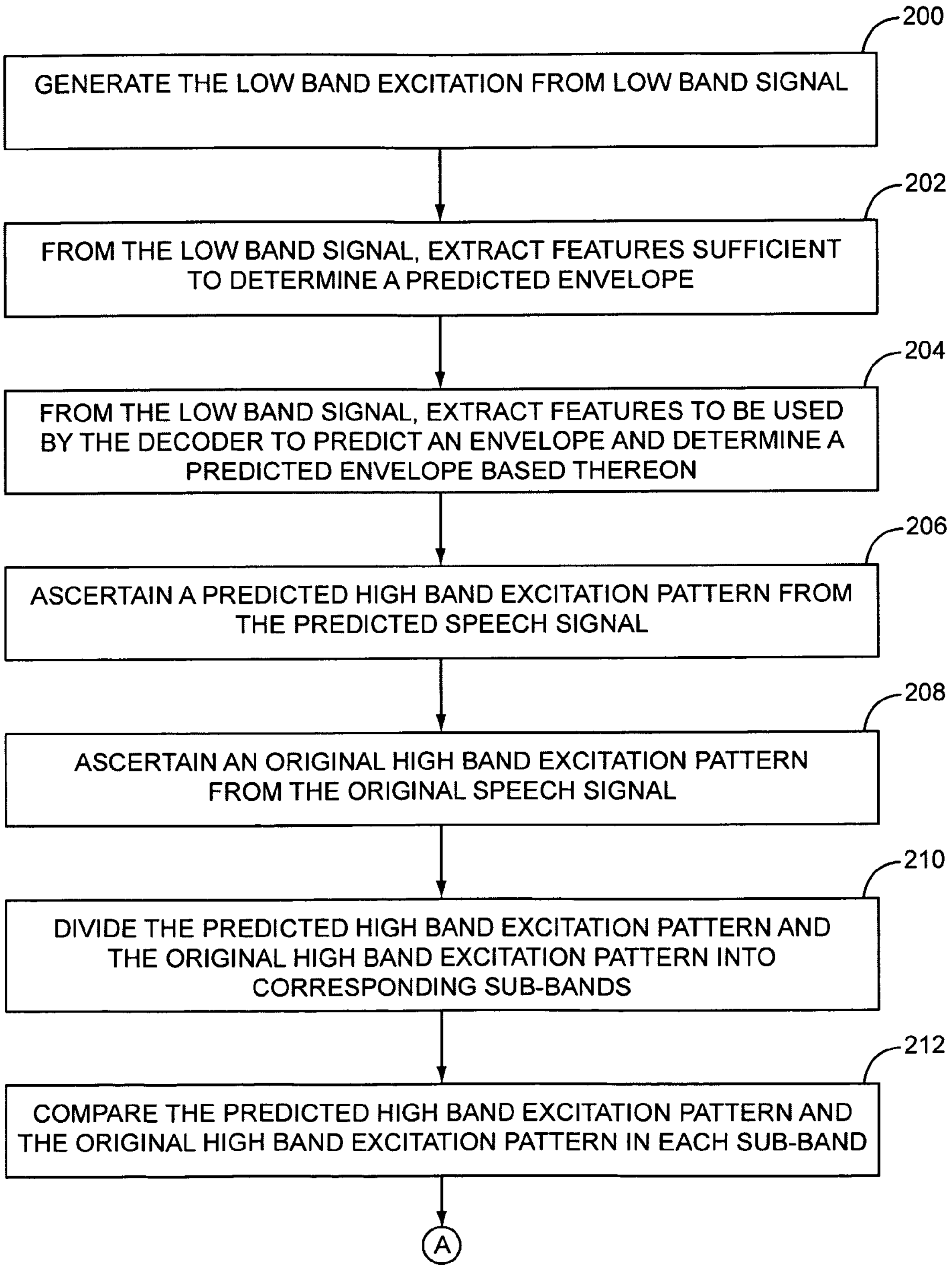
FIGS. 6A and 6B illustrate the comparison of high band excitation patterns for a predicted high band signal and an actual high band signal according to one embodiment of the present invention.
Figure 6B:
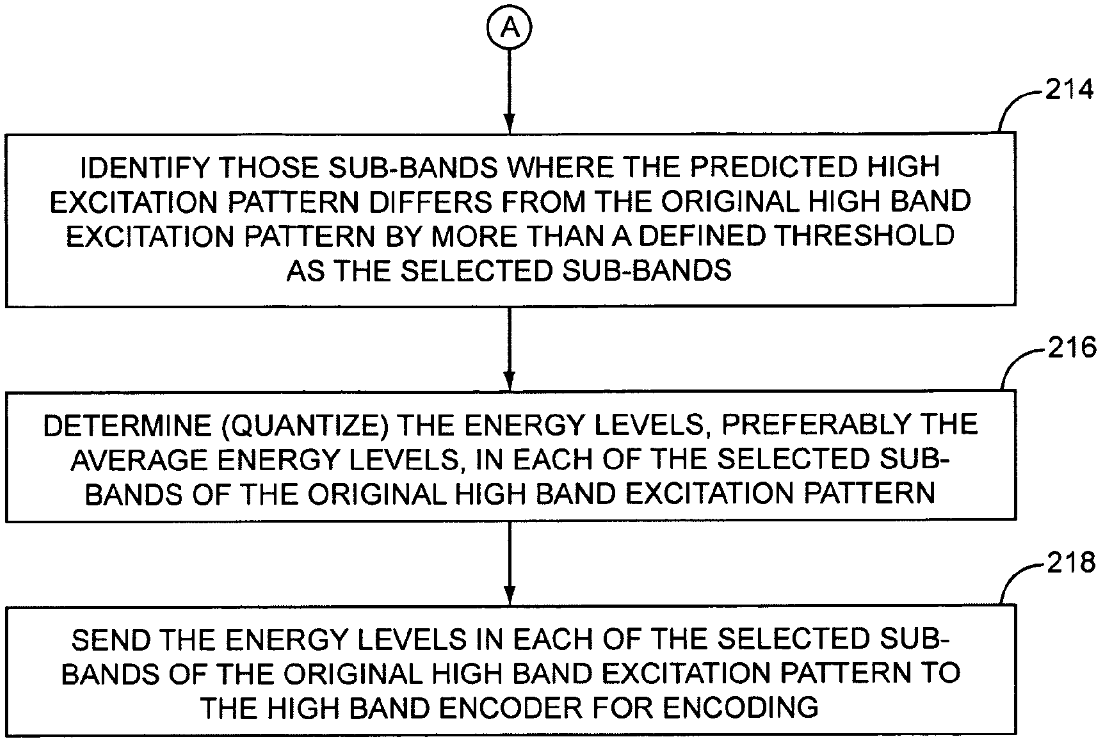

With reference to FIGS. 6A and 6B, a technique for determining the relative differences of a predicted high band envelope and an original high band envelope is provided based on a comparison of excitation patterns for a predicted speech signal and the original speech signal, or at least the high band portion thereof. The processing steps of the flow diagram are preferably provided by the perceptual control function 20. Initially, the low band excitation is generated from the low band signal (step 200). From the low band signal, features that will be used by the decoder 28 to predict an envelope are extracted and the predicted envelope is determined based on these features (step 202). Next, the predicted speech signal is determined based on the low band excitation and the predicted envelope (step 204). In one embodiment, a minimum mean square error (MMSE) estimate is used to determine the predicted speech signal based on the features extracted from the low band signal. Notably, the manner in which the perceptual control function 20 determines the predicted speech signal should correspond to the manner in which the decoder 28 will determine the predicted speech signal during a decoding process.

Next, a predicted high band excitation pattern is ascertained from the predicted speech signal (step 206), and an original high band excitation pattern is ascertained from the original speech signal (step 208). Preferably, the high band that corresponds to both the high band excitation pattern and the original high band excitation pattern is divided into n sub-bands, such that both the predicted high band excitation pattern and the original high band excitation pattern are divided into corresponding sub-bands (step 210). For each sub-band, the predicted high band excitation pattern and the original high band excitation pattern are compared (step 212). Based on the comparison, those sub-bands where the predicted high band excitation pattern differs from the original high band excitation pattern by more than a defined threshold are identified as selected sub-bands (step 214). The selected sub-bands are sub-bands into which the decoder 28 will inject significant error in generating the high band envelope, unless envelope correction information is provided.

To quantify the error in the selected sub-bands, the energy levels in each of the selected sub-bands of the original high band excitation pattern are determined (step 216). Preferably, an energy level corresponds to the average energy level associated with a particular sub-band of the original high band excitation pattern. These energy levels correspond to the envelope correction information that is generated by the perceptual control until 20. As such, the energy levels in each of the selected sub-bands of the original high band excitation pattern are sent to the high band encoder 26 for encoding (step 218). The encoded energy levels correspond to the encoded high band parameters that are combined with the encoded low band signal for a given frame by the combining function 24.

Figure 7:
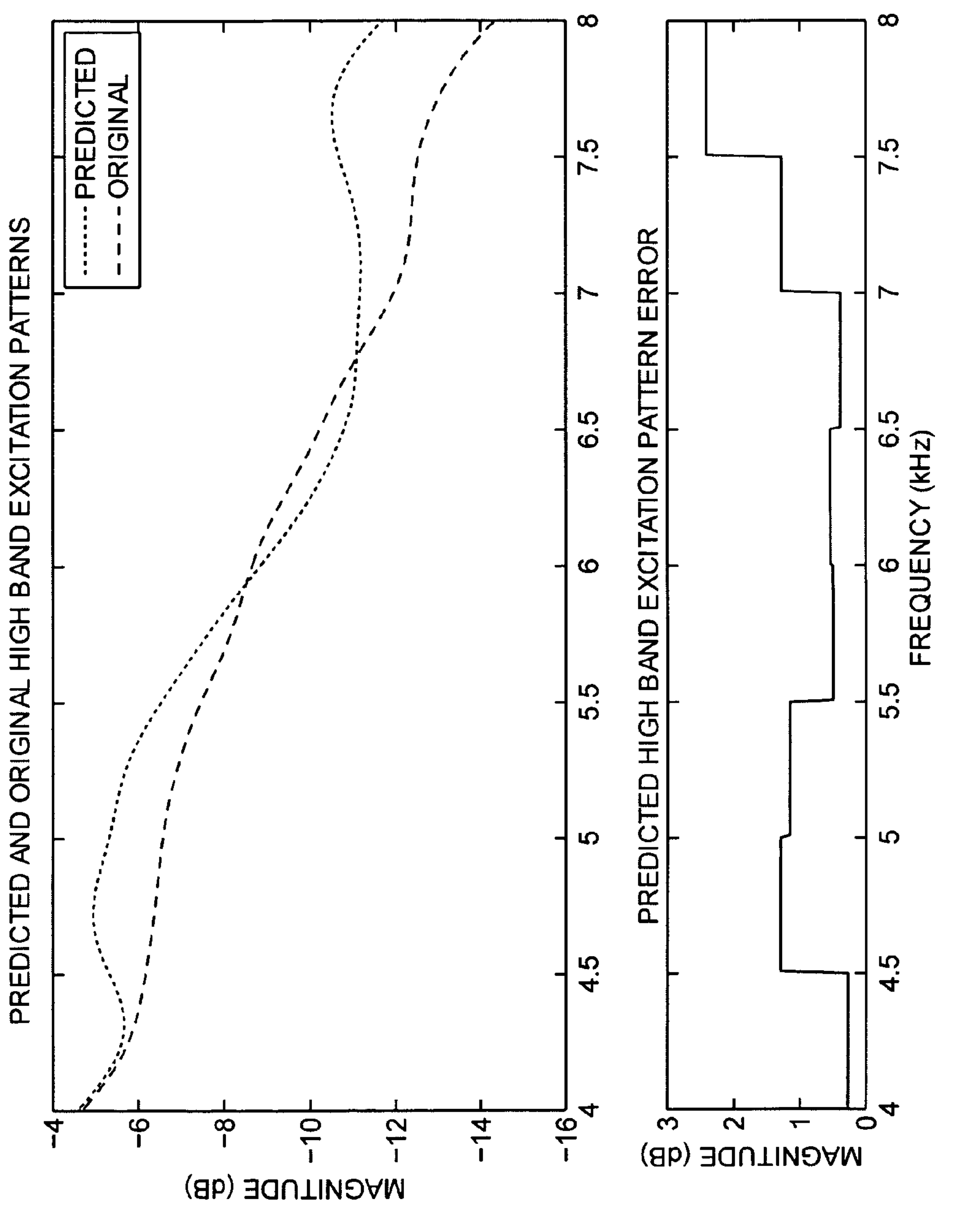
FIG. 7 illustrates the high band excitation pattern error in the high band for a predicted high band excitation pattern.

With reference to FIG. 7, the top graph depicts the predicted and original high band excitation patterns, wherein the predicted high band excitation pattern is generated using an MMSE based estimation technique. The bottom graph depicts the error in the predicted high band excitation pattern. The high band is shown to extend from 4 kHz to 8 kHz, and is divided into eight 500 Hz sub-bands, $SB_1$-$SB_8$. As illustrated, sub-bands $SB_2$, $SB_3$, $SB_7$, and $SB_8$ are the sub-bands associated with the highest errors. According to the concepts of the present invention, these sub-bands may be selected, and the corresponding energy levels of the original high band excitation pattern for these sub-bands may be provided to the high band encoder 26 as high band parameters, which are then encoded and provided along with the corresponding encoded low band signal for a given frame. These sub-bands associated with errors greater than a defined level may vary from frame to frame. Further, the number of sub-bands associated with significant errors may also vary from frame to frame. As such, the rate at which the high band parameters are encoded may vary from frame to frame. As noted above, analysis of the predicted and original high band excitation patterns need not occur, unless the high band signal for a given frame is deemed perceptually relevant by the perceptual control function 20.

Figure 8:
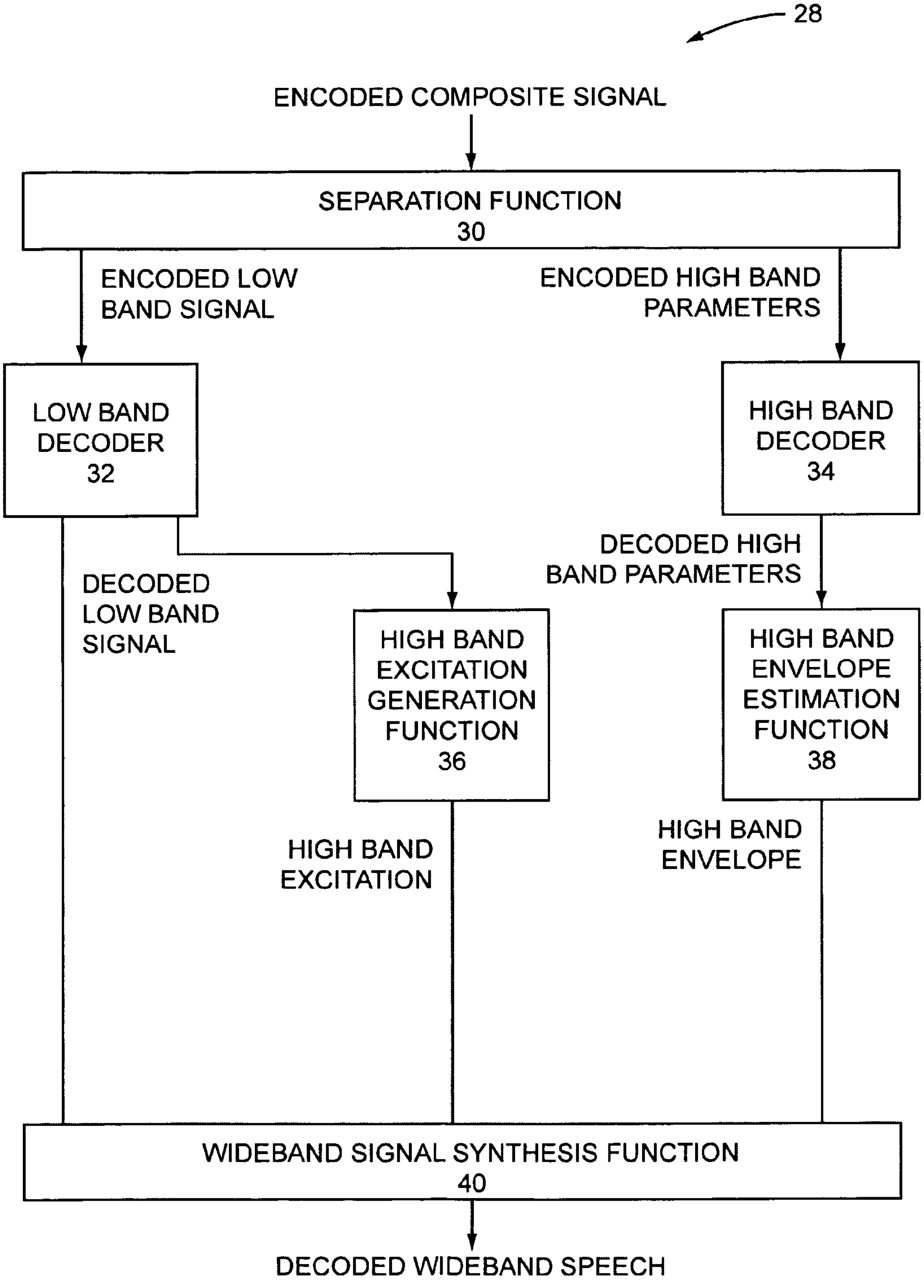
FIG. 8 is a block representation of a decoder according to one embodiment of the present invention.

With reference to FIG. 8, a block representation of the decoder 28 is described according to one embodiment of the present invention. At a high level, the encoded composite signal will arrive at the decoder 28 on a frame-by-frame basis. Depending on how the frame is encoded, the frame may include high band parameters along with the encoded low band signal. Preferably, the encoding indicator is embedded in the frame, and will alert the decoder 28 as to whether the high band parameters are provided in the frame. At a high level, the high band parameters are used by the decoder 28 to compensate for high band MMSE prediction errors. If the high band parameters correspond to the source-filter model, the decoder will use the high band parameters to generate an appropriate high band envelope. The high band excitation that corresponds to the high band envelope may be derived from the decoded low band signal, and preferably from the low band excitation. Having access to the high band excitation and the high band envelope, high band speech may be accurately predicted and added to the decoded low band signal, which corresponds to low band speech, to generate the decoded wideband speech for a given frame.

Accordingly, the encoded composite signal is received by the decoder 28 via a separation function 30, which will separate the encoded low band signal from the encoded high band parameters, if the encoded high band parameters are included in the frame. The separation function 30 may identify the presence of the encoded high band parameters based on the encoding indicator or other information provided in the frame. The encoded low band signal is decoded by a low band decoder 32 to provide a decoded low band signal, which as noted above corresponds to the low band speech. Similarly, the encoded high band parameters are decoded by a high band decoder 34 to provide decoded high band parameters, which correspond to the high band parameters selected by the perceptual control function 20 of the encoder 10. At this point, the decoded low band signal and the high band parameters for the given frame are available. The decoded low band signal is processed by a high band excitation generation function 36 to determine the high band excitation for the high band signal. A high band envelope estimation function 38 will process the decoded high band parameters to determine a corresponding high band envelope. The decoded low band signal, high band excitation, and high band envelope are provided to a wideband signal synthesis function 40. The wideband signal synthesis function 40 will up-sample the decoded low band signal from 8 kHz to 16 kHz to make room for the addition of a decoded high band signal. The decoded high band signal is generated by applying the high band excitation to the high band envelope. If necessary, the decoded high band signal is modulated into the high band, and then added to the up-sampled decoded low band signal to generate the decoded wideband speech.

From the above, a preferred embodiment of the coding scheme of the present invention employs perceptual loudness and bandwidth extension concepts. These concepts are now discussed in greater detail in light of this preferred embodiment. Again assume the encoder 10 operates on 20 ms frames sampled at 16 kHz. The low band signal, $s_{LB}(t)$, is encoded using an existing toll quality linear prediction (LP) coder, while the high band signal, $s_{HB}(t)$, is extended using an algorithm based on the source-filter model. The perceptual control function 20 operates on a frame-by-frame basis and determines whether the current frame benefits from the presence of the high band signal based on perceptual loudness. The presence of the high band signal is referred to as a wideband representation. For frames benefiting from a wideband representation, and thus a 16 kHz sampling rate, an inner ear excitation pattern matching technique is used at the encoder 10 to decide which high band sub-bands to encode. Employing a bandwidth extension technique, the decoder 28 effectively uses a constrained MMSE estimator to generate the high band (envelope) parameters ($\hat{y}$) and artificially generates the high band excitation ($u_{HB}(t)$) from the low-band excitation ($u_{LB}(t)$). These are then combined with the LP-coded low band signal to form the encoded (wideband) speech signal, s'(t).

Initially, details of the perceptual loudness models are described in the context of bandwidth extension. After the perceptual loudness discussion, a detailed discussion of bandwidth extension is provided, again with regard to the preferred embodiment.

The concept of loudness for steady-state and time-varying audio signals is defined by Moore and Glasberg[23,24], which are incorporated herein by reference. The instantaneous loudness of a frame of speech is defined as the loudness of that frame without regarding the effects of temporal masking. In other words, for a particular frame of speech (frame k) the instantaneous loudness is the estimated loudness of frame k without taking into account the effects of previous frames. The short-term and long-term loudness measures are defined using a nonlinear smoothing of the instantaneous loudness using perceptually motivated time constants[13,14]. The short-term loudness (STL) gives a sense of how loudness at time t1 can have an effect on the signal at $t_1$+200 ms. Notably, the time scale remains in milliseconds. The long-term loudness, on the other hand, provides a measure of 'average' loudness over a few seconds of speech and may have a time scale of seconds. The latter has been used in automatic gain control applications as a way of quantifying the effects of sudden attacks on the average perceived loudness of a signal as described in Vickers[25], which is incorporated by reference. To further analyze these concepts, consider FIG. 9, where the original signal and the instantaneous, short-term, and long-term loudness associated with the signal are plotted on a frame-by-frame basis. The instantaneous loudness is only defined during the period when there is a stimulus; however both the LTL and the STL model loudness as having an effect long after the end of the stimulus. Notice for both the short-term and long-term loudness patterns, the estimated metric quickly increases when there is an attack, however it takes longer to 'forget' the attack. As such, periods with appreciable increase in the long-term loudness are very important for the overall perception.

Figure 9:
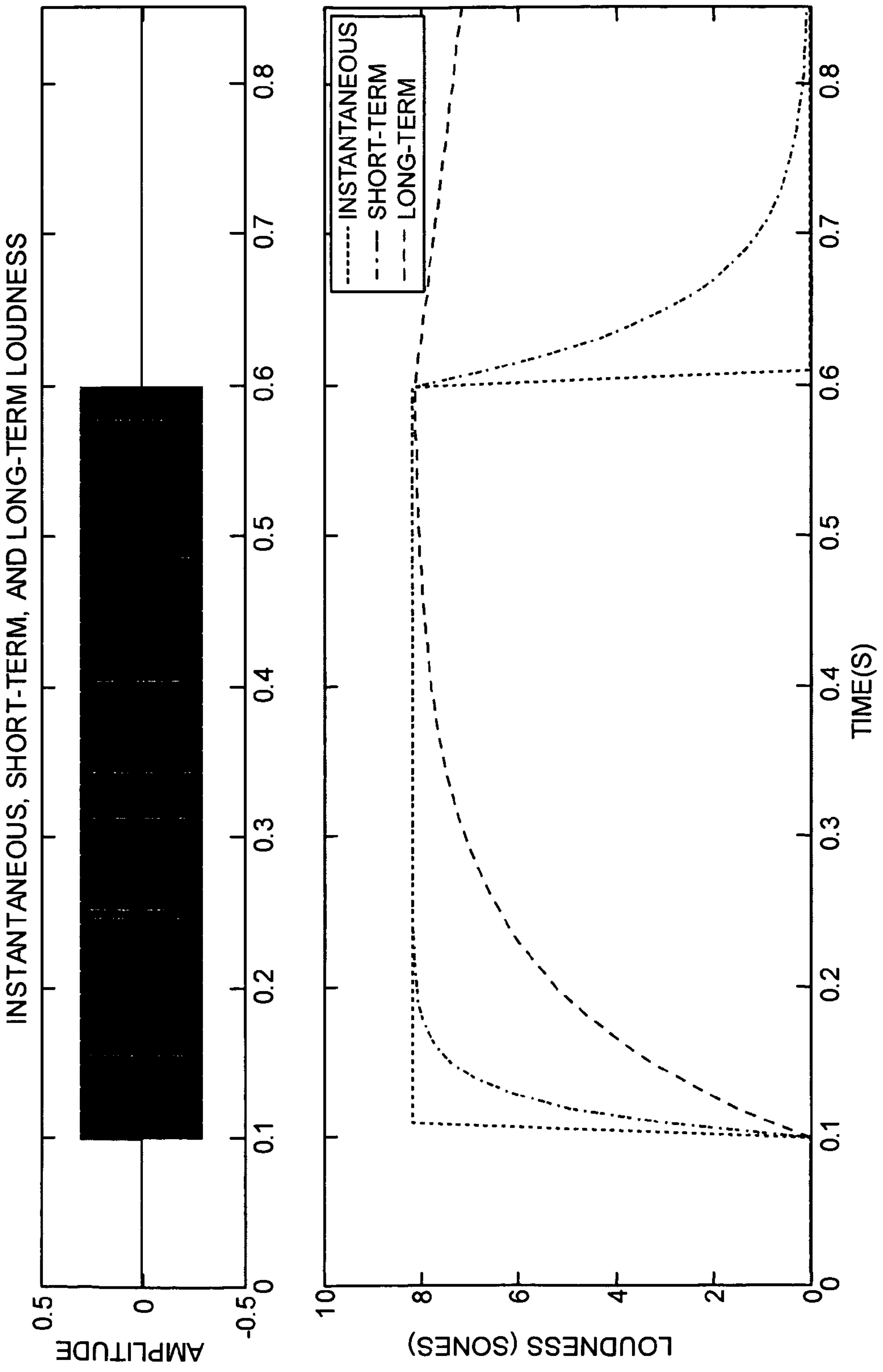
FIG. 9 illustrates the instantaneous, short-term, and long-term loudness on a frame-by-frame basis, along with a corresponding sinusoidal signal from which these parameters are derived.

One of the interesting observations in FIG. 9 is the concept of loudness 'memory.' If there is a sudden increase in the instantaneous loudness of a signal, the long-term loudness is quick to follow, however it takes much longer for it to decrease as described further in Moore and Glasberg[13], which is incorporated herein by reference. In other words, a human's ears quickly become accustomed to a level of loudness coming from a sudden burst of energy and they tend to remember it for relatively long periods of time when they judge the overall loudness of an audio segment. As a result, it is may be important to appropriately encode the sudden bursts in energy. If they are due to a segment of high sonority, then a narrowband representation, the low band signal, may be sufficient; however if there is a significant high band contribution to these bursts, the high band should be encoded.

As described above, perceived loudness is taken into consideration in the proposed rate determination algorithm. The purpose of the rate determination algorithm is to determine the perceptual benefit of a wideband representation for a particular frame of speech. A block diagram of this algorithm is shown in FIG. 10. For each frame of interest, two candidate signals are generated to include the previously coded speech and either a wideband or narrowband version of the current frame, respectively. These candidate signals are the wideband and narrowband speech segments described above. The instantaneous and long-term loudness values of the two resulting speech segments are measured, and a decision is made about whether or not the current frame benefits from a wideband representation.

Algorithm 1 provided below provides pseudo code perceptual loudness determination.

Algorithm 1 Proposed Rate Determination Algorithm

Acquire speech

Construct 20 ms frames

For each frame k

- $S'^{(k)}_{wb,1}(t) = [S'^{(k-1)}_{wb}(t); s^{(k)}_{wb}(t)]$
- $S'^{(k)}_{wb,2}(t) = [S'^{(k-1)}_{wb}(t); s^{(k)}_{wb}(t)]$
- $IL'^{(k)}_{wb,1} = Inst.$ Loudness of $S'^{(k)}_{wb,1}(t)$;
- $IL'^{(k)}_{wb,2} = Inst.$ Loudness of $S'^{(k)}_{wb,2}(t)$;
- $LL'^{(k)}_{wb,1} = LT$ Loudness of $S'^{(k)}_{wb,1}(t)$;
- $LL'^{(k)}_{wb,2} = LT$ Loudness of $S'^{(k)}_{wb,2}(t)$
- $\Delta^{(k)}_{IL} = IL'^{(k)}_{wb,1} - IL'^{(k)}_{wb,2}$
- $\Delta^{(k)}_{LL} = LL'^{(k)}_{wb,1} - LL'^{(k)}_{wb,2}$ -continued

- if $\left(\Delta^{(k)}_{IL} > \delta_{IL} \,||\, \Delta^{(k)}_{LL} > \delta_{LL}\right)$
  - * $S'^{(k)}_{wb}(t) = [S'^{(k-1)}_{wb}(t); s'^{(k)}_{wb}(t)]$
  - * $wb_{dec} = 1$
- else
  - * $S'^{(k)}_{wb}(t) = [S'^{(k-1)}_{wb}(t); s'^{(k)}_{nb}(t)]$
  - * $wb_{dec} = 0$ The algorithm is generalized for frame k. At iteration k, the proposed technique would have already determined the rate of the previous k−1 frames by matching the long-term loudness of the coded signal to that of the original. During this iteration, the encoder 10 has available to it the coded signal up until time k−1, $S'_{wb}{}^{(k-1)}(t)$. This signal is concatenated with both a wideband and a narrowband representation of frame k to form $S'_{wb,1}{}^{(k)}(t)$ or $S'_{wb,2}{}^{(k)}(t)$, respectively. The IL and LTL of both signals are estimated to form $IL'_{wb,1}{}^{(k)}$, $IL'_{wb,2}{}^{(k)}$, $LL'_{wb,1}{}^{(k)}$, and $LL'_{wb,2}{}^{(k)}$. The goal of the algorithm is to match the long-term loudness of the coded segment. As such, the difference in the LTL for both signals is compared to $\delta_{LL}$ and the differences in IL for both signals is compared to pre-determined constant $\delta_{IL}$. Only the high bands of those frames that exceed the thresholds are encoded. The output of the algorithm is a binary decision ($wb_{dec}$) that drives the high band encoder 26. Although the goal is to match the long-term loudness of the signal, it may also be important to analyze the differences in the IL frame k because this will affect the LTL of ensuing frames.

Although a number of techniques exist for the calculation of the instantaneous loudness, the preferred embodiment employs a model proposed by Moore et al.[21], which is incorporated herein by reference. A general overview of this technique is provided below.

Perceptual loudness is defined as the area under a transformed version of the excitation pattern. The excitation pattern (as a function of frequency) associated with the frame of interest is first computed using the parametric spreading function approach described in Moore[26], which is incorporated herein by reference. In the model, the frequency scale of the excitation pattern is transformed to a scale that represents the human auditory system. More specifically, the scale relates frequency (F in kHz) to the number of equivalent rectangular bandwidth (ERB) auditory filters below that frequency[21]. The number of ERB auditory filters, p, as a function of frequency, F, is given by Eq. 1. As an example, for 16 kHz sampled audio, the total number of ERB auditory filters below 8 kHz is about 33.

$$p(F)=21.4\log_{10}(4.37F+1) \qquad \text{Eq. 1}$$

The specific loudness pattern as a function of the ERB filter number, $L_s(p)$, is next determined through a nonlinear transformation of the AEP as shown in:

$$L_s(p)=kE(p)^{\alpha} \qquad \text{Eq. 2}$$

where E(p) is the excitation pattern at different ERB filter numbers, k=0.047, and α=0.3 (empirically determined). Note that the above equation is a special case of a more general equation for loudness given in Moore and Glasberg[21], $L_s(p)=k\lfloor(GE(p)+A)^{\alpha}-A^{\alpha}\rfloor$. The equation above can be obtained by disregarding the effects of low sound levels (A=0), and by setting the gain associated with the cochlear amplifier at low-frequencies to one (G=1). The total instantaneous loudness can be determined by summing the specific loudness per bark, across the whole ERB scale.

$$IL = \int_0^Q L_{P_S}(p)\,dp \qquad \text{Eq. 3}$$

where Q≈33 for 16 kHz sampled audio. Physiologically, this metric represents the total neural activity evoked by a particular sound in the presence of another sound.

Although the IL measure is a good indicator of loudness for stationary signals, it does not take into account the temporal effects of loudness. In other words, the IL assumes that the loudness of the previous frame has no effect on the current frame. A method is required that determines the 'average' loudness over longer speech segments. The long-term loudness does exactly this by temporally averaging the IL using experimentally-determined and psychoacoustically-motivated time constants.

Let IL(l) denote the instantaneous loudness of frame k calculated using the method described above. The LTL, LL(k), is determined using a temporal integration (exponential weighting) as shown in:

$$LL(k)=\alpha IL(k)+(1-\alpha)LL(k-1) \qquad \text{Eq. 4}$$

where, α changes depending on whether the frame of interest is during an attack or release period. A sound attack in speech refers to the time between the onset of a phoneme and the point when that phoneme reaches maximum amplitude. A sound release refers to how quickly the particular phoneme fades away. As an example, consider the phoneme '/s/', whose time amplitude is plotted as a function of time in FIG. 11. The attack and release periods are labeled accordingly. During an attack (defined as IL(k)≧LL(k−1)), $\alpha=\alpha_a=0.045$. During a release (defined as IL(k)≦LL(k−1)), $\alpha=\alpha_r=0.02$. The values of the forgetting factors, $\alpha_a$ and $\alpha_r$, were determined experimentally as described by Moore and Glasberg[23], which is incorporated herein by reference. As discussed earlier, after calculating both the IL and the LTL, the IL and the LTL differences between the wideband and narrowband representations are determined on a frame-by-frame basis to determine whether or not to encode a particular high band.

Attention is now directed to the concepts of using the high band parameters for bandwidth extension, and in particular the use of excitation pattern matching to assist with bandwidth extension. As noted, frames for which it is deemed necessary to transmit additional envelope information, or high band parameters, are subject to further processing. For these frames, the proposed technique compares the excitation pattern of an MMSE estimated envelope at the encoder 10 to that of the original wideband signal. The specifics of MMSE estimation are discussed further below. For now, a process determining how to quantize the high band is described. The main objective of the technique is to correct the MMSE estimation prediction errors by encoding the energy values of the high band sub-bands where the errors are made. The encoded bands are then quantized and sent to the decoder, where they are combined with the MMSE estimator to form the final envelope. As noted, the technique extracts n equally spaced sub-bands and the difference in excitation patterns in each sub-band is measured. The average envelope levels of L sub-bands with the highest error are encoded and transmitted to the decoder 28. The decoder 28 formulates a constrained MMSE estimation that makes use of the L transmitted energy levels and extracted narrowband features to generate the high band parameters.

With reference again to FIG. 7, the excitation pattern associated with the original high band signal and the excitation pattern of an MMSE estimated high band signal is illustrated.

The encoder 10 will determine the difference between the actual and estimated excitation patterns on a sub-band-by-sub-band basis. As shown, the high band is divided in n=8 sub bands. If the encoder 10 encodes the L=4 sub bands for which the estimated excitation pattern deviates from the original the most, then sub-bands $S_2$, $S_3$, $S_7$, and $S_8$, would be encoded as noted above.

Assuming that the allotted bit budget allows for the encoding of L out of n sub-bands, the proposed excitation pattern matching technique provides the L sub-bands to encode. The average envelope levels in each of the L sub-bands are vector quantized (VQ) separately. A 4-bit, 1-dimensional VQ is trained for the average envelope level of each sub-band using the Linde-Buzo-Gray (LBG) algorithm provided in Gray[27], which is incorporated herein by reference. In addition to the indices of the pre-trained VQ's, a certain amount of overhead must also be transmitted in order to determine which VQ-encoded average envelope level goes with which sub-band. A total of n extra bits are required for each frame in order to match the encoded average envelope levels with the selected sub-bands (1 for $wb_{dec}$ and n−1 for the matching). Again, these levels correspond to the high band parameters for the high band signal. The VQ indices of each selected sub-band and the n−1-bit overhead are then combined, or multiplexed, with the low band signal and sent to the decoder 28. As an example of this, consider encoding 4 out of 8 high band sub-bands with 4 bits each. Assuming that sub-bands S2, S3, S7, S8 are selected by the perceptual control function 20 for encoding, the resulting bitstream can be formulated as follows:

$$\{wb_{dec}0110001G_2G_3G_7G_8\}$$

where $wb_{dec}=1$ denotes that the high band must be encoded, the n−1-bit preamble {0110001} denotes which sub-bands were encoded, and $G_i$ represents a 4-bit encoded representation of the average envelope level in sub-band i. Note that only n−1 extra bits are required (not n) since the value of the last bit can be inferred because both the receiver and the transmitter know how many sub-bands are being coded. Although in the general case, n−1 extra bits are required, there are special cases for which overhead can be reduced. Consider again the n=8 high band sub-band scenario. For the cases of two (2) and six (6) sub-bands transmitted, there are only 28 different ways to select two (2) bands from a total of eight (8). As a result, only 5 bits overhead are required to indicate which sub-bands are sent or not sent in the 6 band scenario.

The envelope extension technique of the preferred embodiment is based on a constrained MMSE estimator that predicts the cepstrum of the missing band, y, based on features extracted from the lower band, f, and envelope energy values transmitted from the encoder (if necessary). The problem can be formulated by assuming that the encoder has transmitted L energy values corresponding to L different sub-bands of the high band, denoted by $\epsilon_1 \ldots \epsilon_L$. Furthermore, if y represents the vector of the true cepstral coefficients of the high band and $\hat{y}$ is the corresponding estimate, a constrained MMSE estimation can be formulated as shown in Eq. 5.

$$\min_{\hat{y}} E[\|y-\hat{y}\|^2 \mid f] \qquad \text{Eq. 5}$$

$$s.t.\ \text{Energy in band } 1 - \varepsilon_1$$

$$\text{Energy in band } 2 = \varepsilon_2$$

The constrained optimization problem shown above finds the MMSE estimate of the high band envelope under the constraint that the energy levels in certain sub-bands have specific values. The exact mathematical formulation and solution of this problem is explained below. More specifically, a discussion of the extracted features and the reason for their selection is initially provided and is followed by a mathematical description of the constraints. Finally, a closed form solution to the problem is provided.

Studies have shown that, for certain audio frames, there exists an appreciable correlation between features extracted from the narrowband speech and missing high band components. As a result, a certain set of features is used in one embodiment of the present invention to partially predict the cepstral coefficients of the high band. In FIG. 12, a table lists the features used in this technique and the mutual information between each of the selected low-dimensional feature sets and the high band cepstral coefficients. This information was calculated by Jax and Vary[28], which is incorporated herein by reference. Making use of these narrowband features, the high band LPC cepstrum can be partially predicted. A brief description of the extracted features is provided below.

A number of different representations of the low-band envelope are used as features in bandwidth extension schemes. These include LP coefficients, line spectral frequencies, or reflection coefficients. An alternative representation of the spectral envelope is the LPC cepstrum provided by Markel and Gray[29], which is incorporated herein by reference. The coefficients describing this cepstrum can be derived from the LP coefficients, as shown in Eq. 6.

$$\ln\frac{\sigma^2}{A_{lb}(\omega)} = \sum_{i=-\infty}^{\infty} c_i e^{-ji\omega} \qquad \text{Eq. 6}$$

where $\sigma^2$ is the LP gain and $|A_{lb}(\omega)|^2$ is the magnitude of the frequency response of the LP prediction filter. The main advantage of the cepstral coefficients over other representations is the decorrelation among coefficients. This makes them more amenable to distribution fitting for estimation. This becomes pertinent in the present invention, since the joint multivariate distribution of the input feature space and the high band envelope is modeled using a Gaussian mixture. This is further verified by their use in a number of bandwidth extension algorithms based on estimation[6,30,31,32].

The correlation between energy in the lower band and energy in the high band is intuitive. As a result, energy features are often employed in bandwidth extension algorithms of Nilsson et al.[18], which is incorporated herein by reference. Because the energy within a speech segment varies due to the signal energy for voiced sounds being greater than that for unvoiced sounds, an adaptively normalized frame energy is used in one technique of the present invention.

The zero crossing rate (ZRC) of frame i, $ZCR_i$, counts the number of times that the narrowband speech signal crosses the zero level on a frame-by-frame basis. It has been shown that the dominant frequency of a particular signal can be estimated in the time domain using the zero crossing rate in Kedem[33], which is incorporated herein by reference. This is often used as a feature for discriminating between different types of speech/audio signals (i.e. voiced speech, unvoiced speech, music). Its use in bandwidth extension is intuitive given the differences in the high band spectra of voiced and unvoiced segments.

The pitch period of frame i, $P_i$, depends on the fundamental frequency of a speech segment. For voiced frames, the periodicity of the speech segment can manifest itself throughout the entire spectrum. This ensures that there is a correlation between the pitch in the low band and the envelope in the high band. Although a number of methods for pitch estimation exist, in the algorithm of the present invention, the peaks of the autocorrelation function are used for the estimate in Hess[34], which is incorporated herein by reference.

The kurtosis is a fourth order statistic that serves as a measure of "Gaussianity" for a random variable. More specifically, it is defined in terms of the 2nd and 4th order moments of the signal as follows:

$$K_i = \frac{\frac{1}{N_s}\sum_{k=0}^{N_s-1}(s_{LB}(k))^4}{E_i^2} \qquad \text{Eq. 7}$$

where $N_s$ is the frame length and $E_i$ is the frame energy. It has been shown that there is correlation between the kurtosis in the low band and the envelope of the high band[35].

The spectral centroid can be thought of as the "Center of Gravity" of the magnitude spectrum of the narrowband speech signal. Mathematically it is defined as follows:

$$SC_i = \frac{\sum_{k=0}^{N_2/2} i|S_{LB}(k)|}{\left(\frac{N_s}{2}+1\right)\sum_{k=0}^{N_s/2}|S_{LB}(k)|} \qquad \text{Eq. 8}$$

where $|S_{lb}(k)|$ refers to the magnitude of the DFT of the speech frame. This feature has been used in voiced/unvoiced detection due to the differences in the spectral centroid in voiced and unvoiced frames. As such, this property gives rise to the mutual information between the spectral centroid and the high band envelope.

The ratio between the geometric mean and the arithmetic mean of the magnitude spectrum of a specific signal is called the spectral flatness. The equation is shown in Eq. 9.

$$SF_i = \frac{\left(\prod_{k=0}^{N_s-1}|S_{lb}(k)|^2\right)^{\frac{1}{N_s}}}{\frac{1}{N_s}\sum_{k=0}^{N_s-1}|S_{lb}(k)|^2} \qquad \text{Eq. 9}$$

It has been shown that the arithmetic mean of a set of numbers is always greater than its geometric mean, therefore the spectral centroid always lies between zero and one. In addition to bandwidth extension, a typical application for such a measure is detection of tonality in an audio signal as described in Johnston[36], which is incorporated herein by reference.

The final feature vector for frame i, $f_i$, is formed by concatenating the 10 dimensional narrowband LPC cepstrum with the single dimensional features described above, as shown in Eq. 10.

$$f_i=[c_{nb,1}\ c_{nb,2} \ldots c_{nb,10} E_{norm,i} \mathrm{ZCR}_i P_i K_i SC_i\ SF_i]^T \qquad \text{Eq. 10}$$

This feature vector is used in the MMSE estimation to generate an initial estimate of the high band cepstrum.

Overestimation of the energy in the missing band typically introduces unwanted artifacts in bandwidth extension algorithms as described in Nilsson and Kleijn[6], which is incorporated herein by reference. On the other hand, algorithms that tend to underestimate the energy do not sufficiently enhance the synthesized speech or audio. As a result, correct energy estimation is crucial to the overall quality of the generated audio. As stated above, this technique sends energy values for sub-bands of frames that benefit from the extra information. In this section it is shown how the transmitted energy values can be introduced as constraints in the formulation of the inventive technique.

Let us assume that the decoder 28 has available the energy value of a sub-band i, denoted by $\epsilon_i$. Assume that the encoder 10 deemed this particular sub-band of high perceptual relevance and its energy value was transmitted to the decoder 28. This assessment was made in response to determining the perceptual relevance of the sub-bands based on the proposed excitation pattern matching model. In order to embed the transmitted energy values in the constraint, the relationship between the cepstral coefficients and the envelope of the missing band is characterized. This can be expressed as follows:

$$\ln\frac{\sigma^2}{|A_{hb}(\omega)|^2} = \sum_{i=-\infty}^{\infty} c_i e^{-ji\omega} \qquad \text{Eq. 11}$$

where $\sigma^2$ is the LP gain and $|A_{hb}(\omega)|^2$ is the magnitude of the frequency response of the LP prediction filter of the missing band. Two well-known properties of the cepstral coefficients are:

The coefficients decay as i tends to 1

The cepstral coefficients are even in symmetry

Using these two properties, the summation in Eq. 11 is approximated by retaining only the first M terms and using the symmetry of the coefficients to further simplify the equation. This is shown in Eq. 12.

$$\begin{aligned}\ln\frac{\sigma^2}{|A_{hb}(\omega)|^2} &= \sum_{i=-M}^{0} c_i e^{-ji\omega} + \sum_{i=1}^{M} c_i e^{-ji\omega} \\ &= \sum_{i=1}^{M} c_i e^{-ji\omega} + \sum_{i=1}^{M} c_i e^{-ji\omega} + c_0 \\ &= 2\sum_{i=0}^{M} c_i \cos(i\omega) - c_0\end{aligned} \qquad \text{Eq. 12}$$

The frequency in the above formulation is converted to discrete terms so that it can be written in matrix form. Assume that the spectral envelope was generated with an FFT, therefore the signal has a discrete frequency set $\omega_1 \ldots \omega_N$. The equation can now be written in matrix form:

$$\ln\frac{\sigma^2}{|A_{hb}(\omega)|^2} = 2[\,c_0 \;\; c_1 \;\; \ldots \;\; c_M]\begin{bmatrix} 0.5 & 0.5 & \ldots & 0.5 \\ \cos(\omega_1) & \cos(\omega_2) & \ldots & \cos(\omega_N) \\ \vdots & \vdots & \ddots & \vdots \\ \cos(M\omega_1) & \cos(M\omega_2) & \ldots & \cos(M\omega_N) \end{bmatrix} \qquad \text{Eq. 13}$$

$$= 2\hat{y}^T F_c \qquad \text{Eq. 14}$$

A selector vector is used to extract the energy only in the band for which the value of energy was transmitted. The vector contains all zeros in bands outside the band of interest and it contains all ones in the band of interest. This allows one to mathematically express the energy level constraints as follows:

$$\begin{aligned} &\min_{\hat{y}} E[\|y-\hat{y}\|^2 \mid f] \\ &s.t.\; 2\hat{y}^T F_c s_1 = \varepsilon_1 \\ &2\hat{y}^T F_c s_2 = \varepsilon_2 \\ &\ldots \\ &2\hat{y}^T F_c s_L = \varepsilon_L \end{aligned} \qquad \text{Eq. 15}$$

where $s_i$ is the selector vector corresponding to the ith sub-band of the high band $$s_i^T = \left[00 \ldots 0\overbrace{11 \ldots 1}^{N/L}00 \ldots 0\right].$$

The Lagrangian equation is provided by writing a joint cost function that includes the function to be minimized and the constraints. This is shown below:

$$J(\hat{y}) = E[\|y-\hat{y}\|^2 \mid f] + \lambda_1[2\hat{y}^T F_c s_1 - \varepsilon_1] + \lambda_2[2\hat{y}^T F_c s_2 - \varepsilon_2] + \ldots + \lambda_L[2\hat{y}^T F_c s_L - \varepsilon_L] \qquad \text{Eq. 16}$$

The cost function shown in Eq. 16 is comprised of two parts. The first is the probabilistic minimum squared error and the second is based on the deterministic value of energy transmitted from the coder. This formulation ensures that the energy in certain bands is maintained while also making use of the relationship between the extracted low-band features and the envelope of the missing band. It can be easily shown that the minimizer for the functional in Eq. 16 is given by Eq. 17:

$$\hat{y} = \int y p(y|f) dy + Fc(\lambda_1 s_1 + \ldots + \lambda_L s_L), \qquad \text{Eq. 17}$$

where the $\lambda_i$'s can be computed from the constraints in Eq. 15.

In order to obtain a closed form solution for Eq. 17, it is necessary to estimate the multivariate probability distribution function that describes the joint statistical relationship between the input low-band features and the wideband envelope, p(f, y). A common practice for obtaining the probability distribution of large dimensional problems is to model the distribution using a weighted finite sum of Gaussians forms as provided in McLachlan and Peel[37], which is incorporated herein by reference. The joint distribution can then be written as follows:

$$p(f, y) = \sum_{k=1}^{K} a_k p_k(f, y) \qquad \text{Eq. 18}$$

where $p_k(f, y) = N(C_k, \mu_k)$. The parameters of this model, namely the $C_i$'s and the $\mu_i$'s, are estimated using the expectation maximization (EM) algorithm using approximately 10 minutes of training data obtained from the TIMIT database[38].

It can be shown that the closed form solution to the cost function in Eq. 16 is given by:

$$\hat{y} = \sum_{k=1}^{K} a'_k \left( \mu_k^y + C_k^{yf} {C_h^{ff}}^{-1} \left( f - \mu_k^f \right) \right) + F_c(\lambda_1 s_1 + \ldots + \lambda_L s_L) \quad \text{Eq. 19}$$

where $$a'_k = a_k \frac{p_k(f)}{\sum_{k=1}^{K} a_k p_k(f)}, \; C_k = \begin{bmatrix} C_k^{ff} & C_k^{fy} \\ C_k^{yf} & C_k^{yy} \end{bmatrix}, \text{ and } \mu_k = \begin{bmatrix} \mu_k^f \\ \mu_k^y \end{bmatrix}.$$

In FIGS. 13A and 13B the true high band envelope is shown for two different speech frames, the MMSE estimates of the envelopes, and the constrained MMSE estimates of the envelopes. In both examples, the high band is split into n=8 sub-bands and L=4 of those sub-bands are encoded using the proposed approach. The illustrated envelope is generated using only prediction (the MMSE estimator with no constraints) and the envelope generated using prediction and side information (the constrained MMSE estimator in Eq. 19). As shown, the constrained MMSE estimate is closer to the actual envelope than the envelope solely based on prediction. It is apparent from both figures that the transmitted side information attempts to reduce the errors made by the MMSE estimator. In addition to the envelope, the high band excitation must be generated at the decoder 28. In one embodiment, an appropriately scaled version of the low-band excitation in the high band is used as described above. Further details relating to generating the high band excitation may be found in Berisha et al.[39], which is incorporated herein by reference.

Those skilled in the art will recognize improvements and modifications to the preferred embodiments of the present invention. All such improvements and modifications are considered within the scope of the concepts disclosed herein and the claims that follow.

The following references are identified by the superscripts throughout the text, and are incorporated herein by reference in their entireties.

[1] A. Spanias, "Speech coding: A tutorial review," in Proc. of IEEE, vol. 82, no. 10, October 1994.

[2] G. D. Hair and T. W. Rekieta, "Automatic speaker verification using phoneme spectra," J. Acoust. Soc. Amer., vol. 51, no. 1A, pp. 131-131, 1972.

[3] T. Unno and A. McCree, "A robust narrowband to wideband extension system featuring enhanced codebook mapping," in Proc. IEEE Int. Conf. Acoust., Speech Signal Processing, Philadelphia, Pa., March 2005.

[4] P. Jax and P. Vary, "Enhancement of band-limited speech signals," in Proc. of Aachen Symposium on Signal Theory, September 2001, pp. 331-336.

[5] P. Jax and P. Vary, "Artificial bandwidth extension of speech signals using MMSE estimation based on a hidden markov model," in Proc. IEEE Int. Conf. Acoust., Speech Signal Processing, vol. 1, April 2003, pp. 680-683.

[6] M. Nilsson and W. Kleijn, "Avoiding over-estimation in bandwidth extension of telephony speech," in Proc. IEEE Int. Conf. Acoust., Speech Signal Processing, vol. 2, May 2001, pp. 869-872.

G. Chen and V. Parsa, "HMM-based frequency bandwidth extension for speech enhancement using line spectral frequencies," in Proc. IEEE Int. Conf. Acoust., Speech Signal Processing, vol. 1, May 2004, pp. 709-712.

[8] S. Chen and H. Leung, "Speech bandwidth extension by data hiding and phonetic classification," in Proc. IEEE Int. Conf. Acoust., Speech Signal Processing, vol. 4, April 2007, pp. 593-596.

[9] S. Chen and H. Leung, "Artificial bandwidth extension of telephony speech by data hiding," in Proc. IEEE Int. Symp. on Circuits and Systems, May 2005, pp. 3151-3154.

[10] V. Berisha and A. Spanias, "Wideband speech recovery using psychoacoustic criteria," EURASIP Journal on Audio, Speech, and Music Processing, vol. 2007, 2007.

[11] V. Berisha and A. Spanias, "A scalable bandwidth extension algorithm," in Proc. IEEE Int. Conf. Acoust., Speech Signal Processing, vol. 4, April 2007, pp. 601-604.

[12] B. Geiser and P. Vary, "Backwards compatible wideband telephony in mobile networks: CELP watermarking and bandwidth extension," in Proc. IEEE Int. Conf. Acoust., Speech Signal Processing, vol. 4, April 2007, pp. 533-536.

[13] An 8-32 kbit/s scalable wideband coder bitstream interoperable with G.729, ITU-T Recommendation G.729.1, 2006.

[14] A. McCree, T. Unno, A. Anandakumar, A. Bernard, and E. Paksoy, "An embedded adaptive multi-rate wideband speech coder," in Proc. IEEE Int. Conf. Acoust., Speech Signal Processing, vol. 2, May 2001, pp. 761-764.

[15] A. McCree, "A 14 kb/s wideband speech coder with a parametric highband model," in Proc. IEEE Int. Conf. Acoust., Speech Signal Processing, vol. 2, 2000.

[16] M. Nilsson, S. Anderson, and W. Kleijn, "On the mutual information between frequency bands in speech," in Proc. IEEE Int. Conf. Acoust., Speech Signal Processing, vol. 3, May 2000, pp. 1327-1330.

[17] P. Jax and P. Vary, "An upper bound on the quality of artificial bandwidth extension of narrowband speech signals," in Proc. IEEE Int. Conf. Acoust., Speech Signal Processing, vol. 1, May 2002, pp. 237-240.

[18] M. Nilsson, M. Gustafsson, S. Anderson, and W. Kleijn, "Gaussian mixture model based mutual information estimation between frequency bands in speech," in Proc. IEEE Int. Conf. Acoust., Speech Signal Processing, vol. 1, May 2002.

[19] M. Dietz, L. Liljeryd, K. Kjorling, and O. Kunz, "Spectral band replication, a novel approach on audio coding," in IEEE Aerospace and Electronic Systems, 2002.

[20] B. C. J. Moore and B. R. Glasberg, "Derivation of auditory filter shapes from notched-noise data," Hearing Research, vol. 47, pp. 103-138, 1990.

[21] B. Moore, B. R. Glasberg, and T. Baer, "A model for the prediction of thresholds, loudness, and partial loudness," J. Audio Eng. Soc., vol. 45, no. 4, 1997.

[22] B. R. Glasberg and B. C. J. Moore, "Prediction of absolute thresholds and equal-loudness contours using a modified loudness model." J. Acoust. Soc. Amer., vol. 120, no. 2, pp. 585-588, August 2006.

[23] B. C. J. Moore and B. R. Glasberg, "A model of loudness applicable to time-varying sounds," J. Audio Eng. Soc., vol. 50, pp. 331-342, May 2002.

[24] B. C. J. Moore and B. R. Glasberg, "Audibility of time-varying signals in time-varying backgrounds: Model and data," J. Acoust. Soc. Amer., vol. 115, pp. 2603-2603, May 2001.

[25] E. Vickers, "Automatic long-term loudness and dynamics matching," in Proc. of Audio Eng. Soc. Cony., September 2001.

[26] B. C. Moore, An Introduction to the Psychology of Hearing, fifth edition ed. New York: Academic Press, 2003.

[27] R. Gray, "Vector quantization," ASSP Magazine, vol. 1, no. 2, pp. 4-29, April 1984.

[28] P. Jax and P. Vary, Audio Bandwidth Extension. West Sussex, England: Wiley, 2005, ch. 6, pp. 171-235.

[29] J. Markel and A. Gray, Linear prediction of speech. Springer-Verlag, 1976.

[30] Y. Yoshida and M. Abe, "An algorithm to reconstruct wideband speech from narrowband speech based on codebook mapping," in Proc. Int. Conf. on Spoken Language Processing, 1994, pp. 1591-1594.

[31] C. Avendano, H. Hermansky, and E. Wan, "Beyond nyquist: towards the recovery of broad-bandwidth speech from narrowbandwidth speech," in Proc. of EUROSPEECH, vol. 1, September 1995, pp. 165-168.

[32] M. Abe and Y. Yoshida, "More natural sounding voice quality over the telephone," NTT Rev, vol. 3, no. 7, 1995.

[33] B. Kedem, "Spectral analysis and discrimination by zero-crossings," vol. 74, no. 11, November 1986.

[34] W. Hess, Pitch Determination of Speech Signals. Springer-Verlag, 1983.

[35] P. Jax and P. Vary, "On artificial bandwidth extension of telephone speech," Signal Processing Magazine, vol. 8, no. 83, pp. 1707-1719, 2003.

[36] J. Johnston, "Transform coding of audio signals using perceptual noise criteria," IEEE Journal of Selected Areas in Communication, vol. 6, pp. 314-323, 1988.

[37] G. McLachlan and D. Peel, Finite Mixture Models. Wiley, 2000.

[38] J. S. Garofolo, L. F. Lamel, W. M. Fisher, J. G. Fiscus, D. S. Pallett, and N. L. Dahlgren, "The DARPA TIMIT acousticphonetic continuous speech corpus CD ROM," NTIS order number PB91-100354, Tech. Rep., February 1993.

[39] V. Berisha and A. Spanias, "Wideband speech recovery using psychoacoustic criteria," EURASIP Journal on Audio, Speech, and Music Processing, vol. 2007, 2007.

What is claimed is:

1. A method for encoding a wideband audio signal comprising:

receiving a frame comprising a wideband audio signal, which includes a high band signal and a low band signal;

encoding the low band signal to generate an encoded low band signal;

determining whether the high band signal is perceptually relevant to the low band signal;

if the high band signal is not perceptually relevant to the low band signal, providing for the frame an encoded audio signal containing the encoded low band signal, wherein the encoded audio signal does not include encoding parameters corresponding to characteristics of the high band signal;

if the high band signal is perceptually relevant;

encoding the high band signal to generate an encoded high band signal; and providing for the frame the encoded audio signal containing the encoded low band signal and the encoded high band signal; and wherein encoding the high band signal comprises:

determining a predicted audio signal based on the low band signal;

determining a predicted high band excitation pattern of the predicted audio signal;

determining an original high band excitation pattern of the wideband audio signal;

determining differences between the predicted high band excitation pattern and the original high band excitation pattern;

generating high band parameters of the original high band excitation pattern based on the differences between the predicted high band excitation pattern and the original high band excitation pattern; and encoding the high band parameters to generate the encoded high band signal; and wherein a band of the predicted high band excitation pattern and the original high band excitation pattern is divided into N sub-bands, and determining the differences between the predicted high band excitation pattern and the original high band excitation pattern comprises determining a difference in corresponding energy levels in a plurality of the N sub-bands between the predicted high band excitation pattern and the original high band excitation pattern; and selecting at least one of the plurality of N sub-bands where the difference in the corresponding energy levels of the predicted high band excitation pattern and the original excitation pattern exceeds a defined amount, and generating the high band parameters from the original high band signal based on the differences in the corresponding energy levels in the at least one of the plurality of N sub-bands between the predicted high band excitation pattern and the original high band excitation pattern.

2. The method of claim 1 wherein the audio signal is predominately a speech signal.

3. The method of claim 1 further comprising providing a high band encoding indicator with the encoded audio signal, the high band encoding indicator identifying whether the encoded high band indicator is provided in the encoded audio signal.

4. The method of claim 1 wherein perceptual relevance bears on an ability of a decoder to decode an encoded low band signal that is an encoded version of the low band signal and recover an estimated wideband audio signal corresponding to the wideband audio signal.

5. The method of claim 1 wherein determining whether the high band signal is perceptually relevant to the low band signal comprises:

determining a perceived loudness of the high band signal; and determining whether the high band signal is perceptually relevant to the low band signal based on the perceived loudness of the high band signal.

6. The method of claim 5 wherein determining the perceived loudness comprises:

determining an instantaneous loudness of the high band signal;

determining a long-term loudness of the high band signal; and determining the perceived loudness of the high band signal based on the instantaneous loudness of the high band signal and the long-term loudness of the high band signal.

7. The method of claim 1 wherein when encoding wideband audio signals for a sequence of frames, inclusion of encoded high band signals along with corresponding encoded low band signals is variable and based on a perceptual relevance of corresponding high band signals.

8. The method of claim 1 wherein the high band signal is encoded based on source-filter encoding.

9. The method of claim 8 wherein the low band signal is encoded based on linear predictive coding.

10. The method of claim 1 wherein the encoded high band signal comprises high band parameters corresponding to at least one energy level associated with the high band signal.

11. The method of claim 10 wherein the at least one energy level corresponds to an energy level of an excitation pattern of the high band signal.

12. The method of claim 1 wherein encoding the high band signal comprises:

from the low band signal, extracting features to be used by a decoder to predict a high band envelope for the high band signal;

predicting the high band envelope based on the features to provide a predicted high band envelope;

determining the actual high band envelope of the wideband audio signal; and determining envelope correction information based on differences between the predicted high band envelope and the actual high band envelope, wherein the envelope correction information corresponds to high band parameters of the encoded high band signal.

13. The method of claim 1 wherein determining the differences between the predicted high band excitation pattern and the original high band excitation pattern comprises determining a difference in corresponding energy levels of the predicted high band excitation pattern and the original high band excitation pattern.

14. The method of claim 1 wherein determining the predicted audio signal comprises:

determining an envelope from features extracted from the low band signal; and generating the predicted audio signal based on the envelope.

15. The method of claim 14 wherein the envelope is determined using minimum mean square error estimation.

* * * * *